United States Patent
Koga

(10) Patent No.: US 11,994,435 B2
(45) Date of Patent: May 28, 2024

(54) PRESSURE-SENSITIVE SENSOR

(71) Applicant: TAKANO CO., LTD., Nagano (JP)

(72) Inventor: Yoshiro Koga, Kamiina-gun (JP)

(73) Assignee: TAKANO CO., LTD., Nagano (JP)

( * ) Notice: Subject to any disclaimer, the term of this patent is extended or adjusted under 35 U.S.C. 154(b) by 519 days.

(21) Appl. No.: 17/414,739

(22) PCT Filed: Oct. 15, 2019

(86) PCT No.: PCT/JP2019/040439
§ 371 (c)(1),
(2) Date: Jun. 16, 2021

(87) PCT Pub. No.: WO2020/161961
PCT Pub. Date: Aug. 13, 2020

(65) Prior Publication Data
US 2022/0074800 A1    Mar. 10, 2022

(30) Foreign Application Priority Data

Feb. 6, 2019  (JP) ................................. 2019-019964

(51) Int. Cl.
*G01L 1/22*    (2006.01)
(52) U.S. Cl.
CPC .................. *G01L 1/2287* (2013.01)
(58) Field of Classification Search
None
See application file for complete search history.

(56) References Cited

U.S. PATENT DOCUMENTS

| 4,644,801 A | 2/1987 | Kustanovich |
| 8,966,997 B2 | 3/2015 | Taylor |

(Continued)

FOREIGN PATENT DOCUMENTS

| CN | 107144379 A | 9/2017 |
| JP | 6-59488 U | 8/1994 |

(Continued)

OTHER PUBLICATIONS

Chinese Office Action and Search Report for Chinese Application No. 201980091036.6, dated Oct. 9, 2022, with English translation.

(Continued)

*Primary Examiner* — Daniel S Larkin
(74) *Attorney, Agent, or Firm* — Birch, Stewart, Kolasch & Birch, LLP

(57) ABSTRACT

A pressure-sensitive sensor is capable of measuring pressure distribution over a wide range, measuring pressure consistently in a state of surface contact, and enhancing pressure measurement accuracy in each area of intersection. A pressure-sensitive sensor includes a conductive cloth having a mixture of conductive carbon black and a binder resin applied thereto, a first-electrode cloth disposed on a first-surface of the conductive cloth, and a second-electrode cloth disposed on a second-surface of the conductive cloth, wherein areas of intersection between the first-electrode cloth and second-electrode cloth are formed so as to have a matrix structure, courses or wales of the first-electrode cloth are arranged so as to be parallel or orthogonal to courses or wales of the conductive cloth, and courses or wales of the second-electrode cloth are arranged so as to be parallel or orthogonal to the courses or wales of the conductive cloth.

10 Claims, 16 Drawing Sheets

(56) References Cited

U.S. PATENT DOCUMENTS

2016/0018274 A1 1/2016 Seitz
2018/0319016 A1 11/2018 Ibrocevic et al.

FOREIGN PATENT DOCUMENTS

| JP | 2719090 B2 * | 2/1998 |
| JP | 2010-203809 A | 9/2010 |
| JP | 2013019064 A * | 1/2013 |
| JP | 2014-108134 A | 6/2014 |
| JP | 2018-189648 A | 11/2018 |

OTHER PUBLICATIONS

International Search Report for PCT/JP2019/040439 mailed on Jan. 14, 2020.

* cited by examiner

FIG.10A
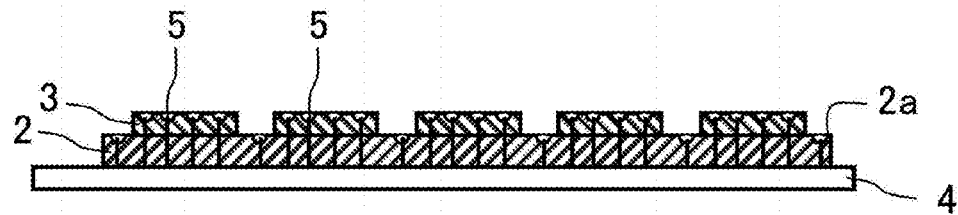
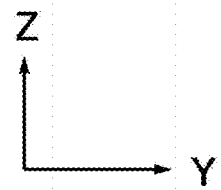
FIG.10B
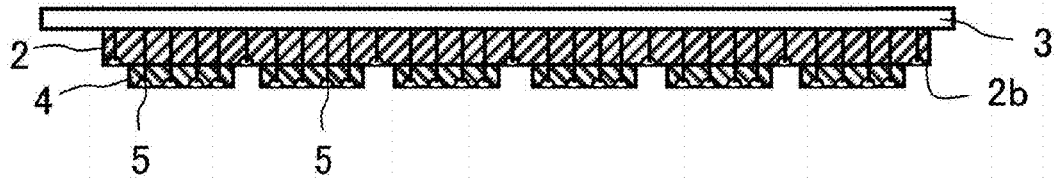
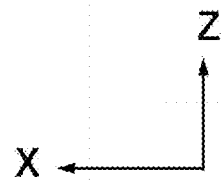

PRESSURE-SENSITIVE SENSOR

TECHNICAL FIELD

The present invention relates to a pressure-sensitive sensor for measuring biological information.

BACKGROUND ART

These days, pressure-sensitive sensors, each of which is capable of measuring pressure distribution of a sleeping posture in a bed, pressure distribution of a sitting posture in a chair, etc. as biological information, have been used for care, health promotion, etc. In case of measuring biological information by bringing a sensor into contact with a human body, a pressure-sensitive sensor, which has flexibility with less uncomfortable feeling and has a large size corresponding to a human body and is capable of measuring pressure distribution in a wide range, has been required.

Conventionally, a pressure-sensitive sensor, which comprises: a cloth body composed of a conductive material, in which a cloth is coated with a mixture of conductive high polymer and a binder resin; and a plurality of conductive line-shaped members coated with conductive high polymer and arranged to contact both faces of a conductive surface of the cloth body, and in which the line-shaped members arranged nearly parallel on the front face of the conductive surface are arranged nearly orthogonal with respect to the line-shaped members arranged nearly parallel on the back face of the conductive surface, has been proposed (see Patent Literature 1: Japanese Laid-open Patent Publication No. 2014-108134).

Further, a pressure-sensitive sheet composed of cloth, which comprises a first-layer sheet, a second-layer sheet and a third-layer sheet and in which the first- and third-layer sheets have conductive paths to which conductive particles are applied at prescribed intervals, the conductive paths of the first-layer sheet are directed sideward with respect to the conductive paths of the third-layer sheet and electric property of the second-layer sheet is varied by pressure, has been proposed (see Patent Literature 2: U.S. Pat. No. 8,966,997).

CITATION LIST

Patent Literature

Patent Literature 1: Japanese Laid-open Patent Publication No. 2014-108134
Patent Literature 2: U.S. Pat. No. 8,966,997

SUMMARY OF INVENTION

Technical Problem

In the pressure-sensitive sensor described in Patent Literature 1, pressure is measured in a state where the conductive cloth body and the conductive line-shaped members are purposely brought into point-contact or line-contact with each other. Further, in the pressure-sensitive sensor described in Patent Literature 2, pressure is measured in a state where a pressure-sensitive cloth is sandwiched between electrode cloths, which are selectively plated with conductive noble metal particles; in this case, fibers constituting the facing surfaces come into point- or line-contact with each other.

In case of performing the conventional measuring manners in the point- or line-contact state, contact resistances must be increased, and the contact states are unstable, so fluctuation of resistance values must be large. Especially, in case that the cloth is woven fabric, intersection points are projected, so a state of point contact is caused and contact resistance is increased; further, positions of the intersection points are displaced due to stretchability of the cloth, so the contact state is further unstable and contact resistance is increased. As the result, there is a problem that reproducibility of pressure-sensitive resistance is low and desired measurement cannot be performed.

In case of plating the cloth with conductive noble metal particles as well as the conventional technology, a material cost must be highly increased. Removing oil content, applying a catalytic agent, activating the surface of the cloth, etc. must be performed as pretreatment of plating, so processing steps must be complex, and the cloth will be damaged by the chemical treatments. Further, a size of the cloth is restricted by a size of a plating facility, so it is difficult to produce a pressure-sensitive sensor having a large size.

Solution to Problem

The present invention has been performed in light of the above-described circumstances, and an object is to provide a pressure-sensitive sensor capable of taking advantage of flexibility of cloth, measuring pressure distribution over a wide range, measuring pressure consistently in a state of surface contact, and enhancing pressure measurement accuracy in each area of intersection.

The present invention has been accomplished under the solutions as described below.

The pressure-sensitive sensor of the present invention comprises: a conductive cloth having a mixture of conductive carbon black and a binder resin applied thereto; a first-electrode cloth disposed on a first-surface of the conductive cloth; and a second-electrode cloth disposed on a second-surface of the conductive cloth, the conductive cloth is a knitted fabric composed of non-conducting fiber yarns, the first-conductive cloth is a knitted fabric in which a plurality of first-electrodes composed of conducting fiber yarns are formed at first-intervals, the second-conductive cloth is a knitted fabric in which a plurality of second-electrodes composed of conducting fiber yarns are formed at second-intervals, and the first-electrodes and the second-electrodes are arranged in a direction intersecting with each other, or the conductive cloth is a knitted fabric composed of non-conducting fiber yarns, the first-electrode cloths and the second-electrode cloths are knitted fabrics composed of conducting fiber yarns, the first-electrode cloths and the second-electrode cloths are arranged in directions intersecting with each other, and areas of intersection between the first electrode cloths and second electrode cloths are formed so as to have a matrix structure, and courses or wales of the first-electrode cloth are arranged so as to be parallel or orthogonal to courses or wales of the conductive cloth, and courses or wales of the second-electrode cloth are arranged so as to be parallel or orthogonal to the courses or wales of the conductive cloth.

With the above-described structure, the conductive cloth, the first-electrode cloth and the second-electrode cloth are composed of knitted fabrics having superior stretchability, the areas of intersection are formed so as to have the matrix structure, the courses or wales of the first-electrode cloth are arranged so as to be parallel or orthogonal to the courses or wales of the conductive cloth, and the courses or wales of the second-electrode cloth are arranged so as to be parallel or orthogonal to the courses or wales of the conductive cloth, so that advantages of stretchability and flexibility of the knitted fabrics can be taken, and desired measurement can be performed in a stable contact state of the mutually-facing loops. Further, the mixture of conductive carbon black and the binder resin is applied to the knitted fabrics, so that advantages of stretchability and flexibility with less uncomfortable feeling can be taken, and a large pressure-sensitive sensor corresponding to human bodies can be produced without being restricted by a facility size. Further, the conductive carbon black has a branch structure, a resistance value can be reduced by tunnel effect, and the conductive carbon black is more inexpensive than noble metals and conductive high polymers, so that productivity can be made high with reducing a material cost. Further, a resistance value of the conductive cloth is larger than resistance values of the first-electrode cloth and the second-electrode cloth, so that dispersion of resistance values and crosstalk based on measurement positions can be suppressed. As the result, pressure distribution over a wide range can be measured, pressure can be consistently measured in the state of surface contact, and pressure measurement accuracy in each area of intersection can be enhanced.

In this specification, the courses or wales of each of the electrode cloths (i.e., the first-electrode cloth and the second-electrode cloth) are arranged so as to be parallel to the courses or wales of the conductive cloth, such that, as an example, an angle (a relative angle) of a center line of each loop in a travelling direction of the loop is set within 0±10 [degrees]; with this structure, a contact resistance becomes a minimum value or a value near the minimum value. Here, generating combination-dispersion of the first-electrode cloth, the conductive cloth and the second-electrode cloth, within an allowable range, in a production process is considered. To suppress dispersion of pressure-sensitive resistances, the relative angle is set within 0±10 [degrees], preferably within 0±5 [degrees], more preferably within 0±2 [degrees].

Further, in this specification, the courses or wales of each of the electrode cloths (i.e., the first-electrode cloth and the second-electrode cloth) are arranged so as to be orthogonal to the courses or wales of the conductive cloth, such that, as an example, the angle (the relative angle) of the center line of each loop in the travelling direction of the loop is set within 90±10 [degrees]; with this structure, a contact resistance becomes a maximum value or a value near the maximum value. Here, generating combination-dispersion of the first-electrode cloth, the conductive cloth and the second-electrode cloth, within an allowable range, in the production process is considered. To suppress dispersion of pressure-sensitive resistances, the relative angle is set within 90±10 [degrees], preferably within 90±5 [degrees], more preferably within 90±2 [degrees].

Preferably, the first-electrode cloth and the second-electrode cloth are the same knitted fabrics. With this structure, the areas of intersection are formed so as to have the matrix structure, the travelling direction of the loops of each electrode cloth can be easily set parallel to or orthogonal to the travelling direction of the loops of the conductive cloth, and number of parts can be reduced, so that a rational structure can be realized. Here, warp knitting and warp knitting are same knitted fabrics, and weft knitting and weft knitting are same knitted fabrics.

Preferably, a contact surface of the first-electrode cloth which contacts the conductive cloth and a contact surface of the second-electrode cloth which contacts the conductive cloth have the same knitting patterns. More preferably, both of a face stitch-side and a back stitch-side of the knitting pattern are regularly arranged in the courses or wales. With this structure, dispersion of contact resistances can be suppressed and stabilized. The term "same knitting patterns" refers to identical knitting patterns or similar knitting patterns. For example, plain stitch and plain stitch are the same knitting patterns, rib stitch and rib stitch are the same knitting patterns, pile stitch and pile stich are the same knitting patterns, and jacquard stitch and jacquard stitch are the same knitting patterns. Further, for example, tricot stitch and tricot stitch are the same knitting patterns, raschel stitch and raschel stitch are the same knitting patterns, and crochet stitch and crochet stitch are the same knitting patterns.

Preferably, a contact surface of the conductive cloth which contacts the first-electrode cloth and a contact surface of the first-electrode cloth which contacts the conductive cloth have the same knitting patterns, and a contact surface of the conductive cloth which contacts the second-electrode cloth and a contact surface of the second-electrode cloth which contacts the conductive cloth have the same knitting patterns. With this structure, the measurement can be stably performed at the position where a contact resistance value becomes a minimum value or maximum value.

Preferably, a contact surface of the first-electrode cloth which contacts the conductive cloth and the opposite surface thereof have different knitting patterns, a contact surface of the second-electrode cloth which contacts the conductive cloth and the opposite surface thereof have different knitting patterns, and the contact surface of the first-electrode cloth which contacts the conductive cloth and the contact surface of the second-electrode cloth which contacts the conductive cloth have the same knitting patterns. With this structure, dispersion of contact resistances can be suppressed and stabilized with corresponding to variations of knitted fabrics.

As an example, the fabrics are weft knitting knitted by a flat knitting machine, full-fashion knitting machine or circular knitting machine. For example, weft knitting may be formed by plain stitch, rib stitch, pearl stitch, tuck stitch, pile stitch, jacquard stitch and other known weft knitting stitches.

The knitted fabric is warp knitting knitted by, for example, a tricot knitting machine, raschel knitting machine, crochet knitting machine or Milanese knitting machine. For example, warp knitting may be formed by tricot stitch, satin stitch, inlaid stitch, raschel stitch, double raschel stitch, crochet stitch, chain stitch, atlas stitch, Milanese stitch and other known warp knitting stitches.

Preferably, a pitch of loops in the courses or wales of the first-electrode cloth is set to twice the size of a loop diameter or less, a pitch of loops in the courses or wales of the second-electrode cloth is set to twice the size of a loop diameter or less, and a pitch of loops in the courses or wales of the conductive cloth is set to twice the size of a loop diameter or less. With this structure, a contact area in a transverse direction or longitudinal direction can be increased, so that dispersion of contact resistances can be suppressed and stabilized.

As an example, a loop pitch of the courses or wales of the conductive cloth is in a range from 0.5 times to 2 times of a loop pitch of the courses or wales of the first-electrode cloth, and the loop pitch of the courses or wales of the conductive cloth is in a range from 0.5 times to 2 times of a loop pitch of the courses or wales of the second-electrode cloth. With this structure, mutual dispersion of contact resistances in the transverse direction or longitudinal direction can be suppressed and stabilized.

As an example, the non-conducting fiber yarn is a synthetic yarn including at least any one of polyester, polyamide, nylon, rayon, acrylic and polyurethane. With this structure, a knitted fabric having pleasant feeling can be produced, and superior chemical resistance can be produced. To suppress contact resistance, a preferable non-conducting fiber yarn is multifilament. A thickness of the non-conducting fiber yarn is 20-200 denier.

The non-conducting fiber yarn is applied to the conductive cloth. In some cases, the non-conducting fiber yarns are knitted in the first-electrode cloth to form first-intervals, and the non-conducting fiber yarns are knitted in the second-electrode cloth to form second-intervals. Further, in some cases, exposed areas of the conducting fiber yarns are varied by knitting the non-conducting fiber yarns in parts of the first-electrodes and the second-electrodes so as to adjust contact areas with respect to the conductive cloth. The conducting fiber yarns are knitted in parts of or entire the first-electrodes and the second-electrodes. The conducting fiber yarn includes at least any one of gold, silver, copper, nickel, aluminum and alloy thereof. As an example, in some cases, the metal is used to coat synthetic yarns or kneaded in synthetic yarns.

As an example, the conducting fiber yarn is a covered yarn in which a synthetic core yarn including at least any one of polyamide, nylon, rayon, acrylic and polyurethane is covered with a yarn formed by coating a polyester yarn, polyamide yarn or nylon yarn with silver. With this structure, the conducting fiber yarn has superior stretchability. The coating may be performed by plating, vapor deposition or other coating methods.

As an example, the conducting fiber yarn is a wooly-processed yarn which is formed by coating a polyester yarn, polyamide yarn or nylon yarn with silver and being wooly-processed. With this structure, the conducting fiber yarn has superior stretchability, and contact ability to the conductive cloth can be improved by increasing the surface area.

Preferably, a thickness of the conductive metal with respect to a diameter of the yarn to be coated is from 1% or more to 10% or less. With this structure, flexibility of the yarn to be coated can be secured with suppressing a resistance value thereof in a longitudinal direction. Especially, silver has superior extensibility, so that a conductive thin film can be formed; and silver ions have strong sterilizing power to germs, e.g., bacterium, so that a superior antibacterial effect can be obtained.

Preferably, the conductive carbon black is at least any one of KETJENBLACK™ acetylene black, channel black, and furnace black in each of which an average particle diameter of the primary particles is 100 nm or less. With this structure, the conductive cloth can have superior abrasion-resistance and flexibility.

Preferably, a weight of the conductive carbon black with respect to that of the conductive cloth is 1% to 5%. With this structure, a required resistance value can be obtained by adding a small quantity of the conductive carbon black.

Preferably, the pressure-sensitive sensor further comprises sewing threads, the first-electrode cloth is sewn to the conductive cloth with the sewing threads, and the second-electrode cloth is sewn to the conductive cloth with the sewing threads. With this structure, the electrode cloths are integrated with the conductive cloth by sewing, so that positional displacement of measurement parts can be prevented, and pressure can be consistently measured with taking advantage of flexibility of the cloths. Further, a size capable of measuring pressure distribution over a wide range can be realized. Pressure can be consistently measured in the state of surface contact, a material cost can be suppressed, and productivity can be enhanced. Further, borders of the areas of intersection are stabilized by sewing, so that pressure measurement accuracy in each of the areas of intersection can be enhanced.

As an example, the pressure-sensitive sensor corresponding to a bed size, e.g., width 900 [mm]×length 1800 [mm], can be produced; in this case, the conductive cloth is sandwiched between the first-electrode cloth, in which widths of first-electrode stripes are 25 [mm] and insulating stripes of 5 [mm] form stripe pitches, and the second-electrode cloth, in which widths of second-electrode stripes are 25 [mm] and insulating stripes of 5 [mm] form stripe pitches, so that the pressure-sensitive sensor, which includes 1800 pressure-sensitive cells formed in the areas of intersection whose each side is 25 [mm] and which are capable of measuring pressure distribution, can be produced. Further, the first-electrode cloth and the second-electrode cloth are sewn, with non-conducting sewing threads, in areas of the insulating stripes, so that positional displacement of the first-electrode cloth and the second-electrode cloth can be prevented, and the large size pressure-sensitive sensor having superior reproducibility of pressure-sensitive property can be produced.

Advantageous Effects of Invention

According to the present invention, the advantages of flexibility and stretchability of the knitted fabrics can be taken, and desired measurement can be performed by the stable contact state of the mutually-facing loops. Further, the mixture of conductive carbon black and the binder resin is applied to the knitted fabric, so that a large size sensor corresponding to human bodies can be produced, without being restricted by a size of facility, e.g., plating facility, with taking advantages of flexibility and stretchability, with less uncomfortable feeling to human bodies. The conductive carbon black has the branch structure, the resistance value can be reduced by the tunnel effect, and the carbon black is more inexpensive than noble metals and conductive high polymers, so that productivity can be improved with reducing a material cost. Further, the resistance value of the conductive cloth is larger than those of the first-electrode cloth and the second-electrode cloth, so that dispersion of resistance values and crosstalk based on measurement positions can be suppressed. As the result, pressure distribution over a wide range can be measured, pressure can be consistently measured in the state of the surface contact, and pressure measurement accuracy in each area of intersection can be enhanced.

BRIEF DESCRIPTION OF DRAWINGS

FIG. 10A is a sectional view taken along a line I-I shown in FIG. 8, and FIG. 10B is a sectional view taken along a line II-II shown in FIG. 8.

FIG. 1C is a schematic sectional view showing a state where the electrode cloth and the conductive cloth are sewn by repeatedly moving the cloths in a prescribed direction with forming knots.

DESCRIPTION OF EMBODIMENTS

Figure 7:
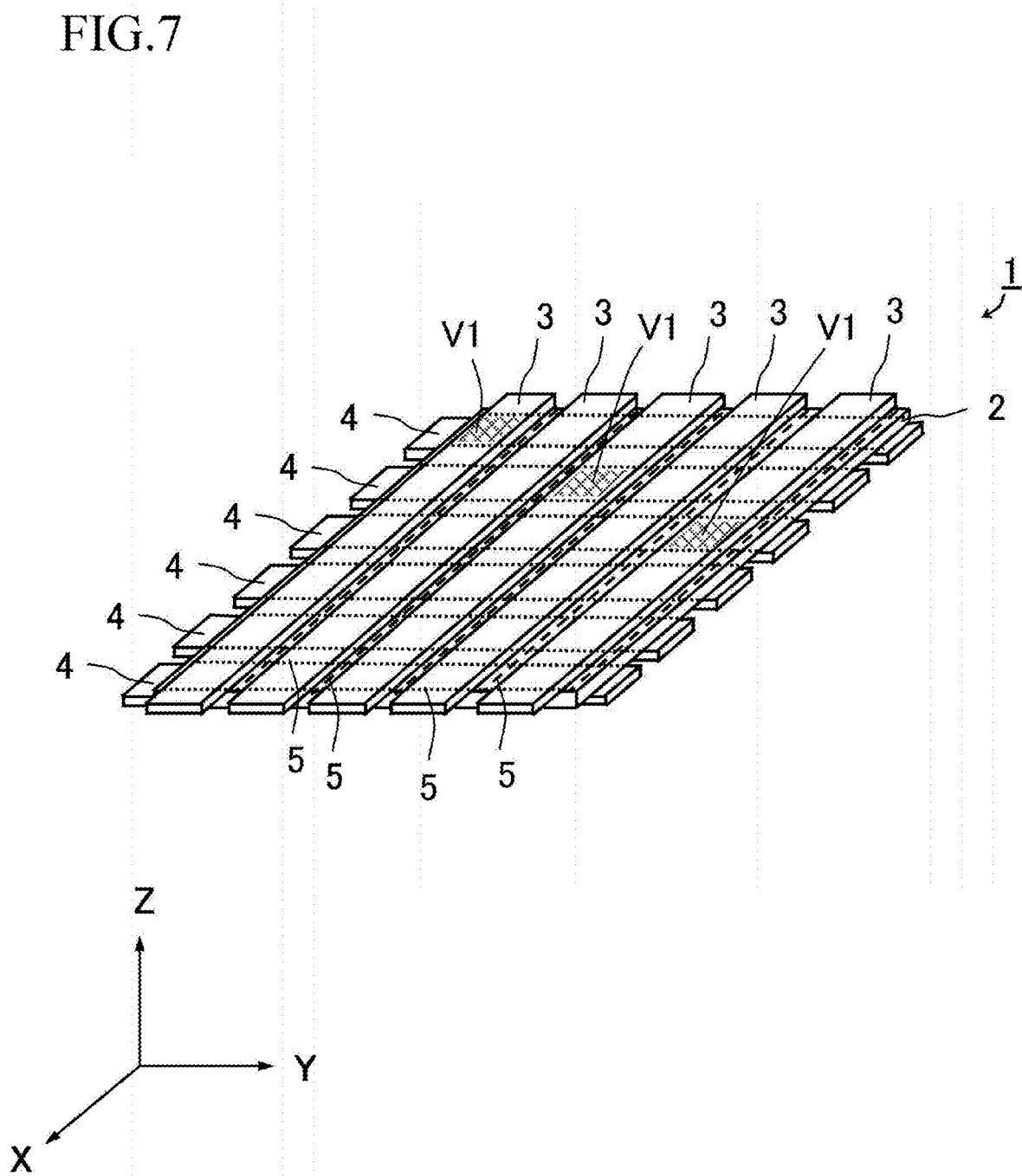
FIG. 7 is a schematic perspective view of a pressure-sensitive sensor of a first-example.

Hereinafter, an embodiment of the present invention will be explained in detail with reference to the drawings. FIG. 7 and FIG. 13 are schematic perspective views of examples of the pressure-sensitive sensor 1. For convenience of explanation, a cover cloth, signal wires, etc. are omitted in FIG. 7, FIG. 13, etc. Details of FIG. 7 to FIG. 16 will be described later. Here, structural members having the same function are assigned the same numeric symbol in all of the drawings, and reexplanation will be omitted in some cases. Note that, each of first-surfaces 2a, 3a and 4a and each of second-surfaces 2b, 3b and 4b are disposed apart 180 [degrees] from each other and directed in the opposite directions, relative positional relationships are indicated, and physical directions are not limited. The first-surfaces 2a, 3a and 4a may be replaced with, for example, upper surfaces, front surfaces, face stitch-sides. And, the second-surfaces 2b, 3b and 4b may be replaced with, for example, lower surfaces, back surfaces, back stitch-sides.

FIG. 1 to FIG. 4 are schematic structural development views, each of which indicates an example of arranging a first-electrode cloth 3, a conductive cloth 2 and a second-electrode cloth 4 in an area V1 of intersection of the pressure-sensitive sensor 1 of the embodiment. In the examples shown in each of FIG. 1 and FIG. 2, all of the first-electrode cloth 3, the conductive cloth 2 and the second-electrode cloth 4 are formed by weft knitting. In the examples shown in FIG. 3 and FIG. 4, all of the first-electrode cloth 3, the conductive cloth 2 and the second-electrode cloth 4 are formed by warp knitting. For convenience of explanation, in FIG. 1 to FIG. 4, first-surfaces 2a, 3a and 4a are seen from an upper side, and second-surfaces 2b, 3b and 4b are seen from a lower side.

Figure 1:
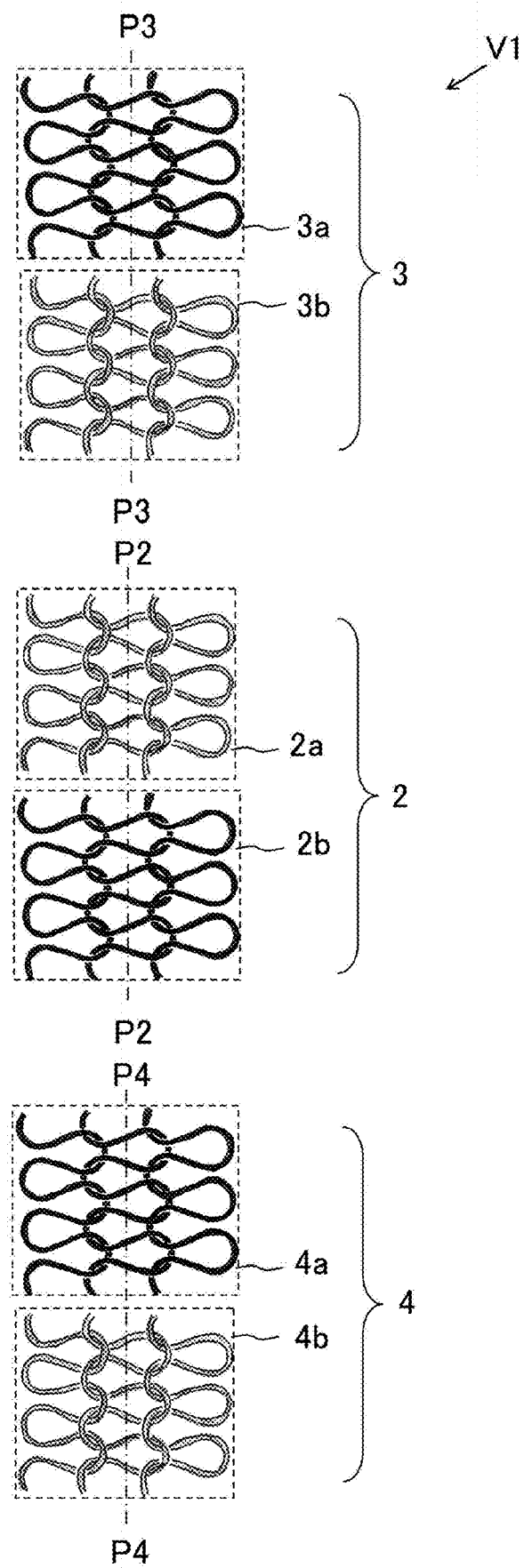
FIG. 1 is a schematic structural development view, which indicates an example of arranging electrode cloths and a conductive cloth in an area of intersection of a pressure-sensitive sensor of an embodiment.

In the example shown in FIG. 1, the first-surface 3a, the second-surface 2b and the first-surface 4a are face stitch-sides formed by plain stitch, and the first-surface 2a, the second-surface 3b and the second-surface 4b are back stitch-sides formed by plain stitch. Further, a course P3 of the first-electrode 3 is arranged so as to be parallel to a course P2 of the conductive cloth 2, and a course P4 of the second-electrode cloth 4 is arranged so as to be parallel to the course P2 of the conductive cloth 2.

Figure 2:
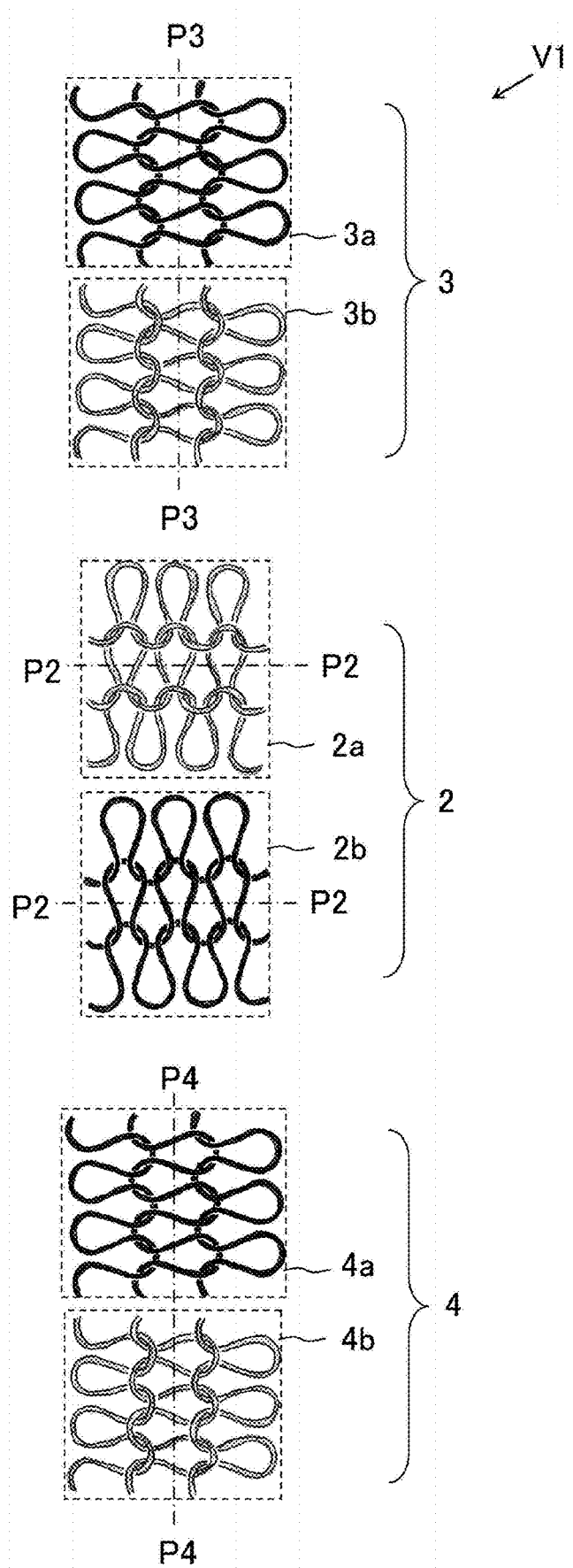
FIG. 2 is a schematic structural development view, which indicates another example of arranging electrode cloths and a conductive cloth in an area of intersection of a pressure-sensitive sensor of the embodiment.

In the example 2 shown in FIG. 2, the first-surface 3a, the second-surface 2b and the first-surface 4a are face stitch-sides formed by plain stitch, and the first-surface 2a, the second-surface 3b and the second-surface 4b are back stitch-sides formed by plain stitch. Further, the course P3 of the first-electrode 3 is arranged so as to be orthogonal to the course P2 of the conductive cloth 2, and the course P4 of the second-electrode cloth 4 is arranged so as to be orthogonal to the course P2 of the conductive cloth 2.

Figure 3:
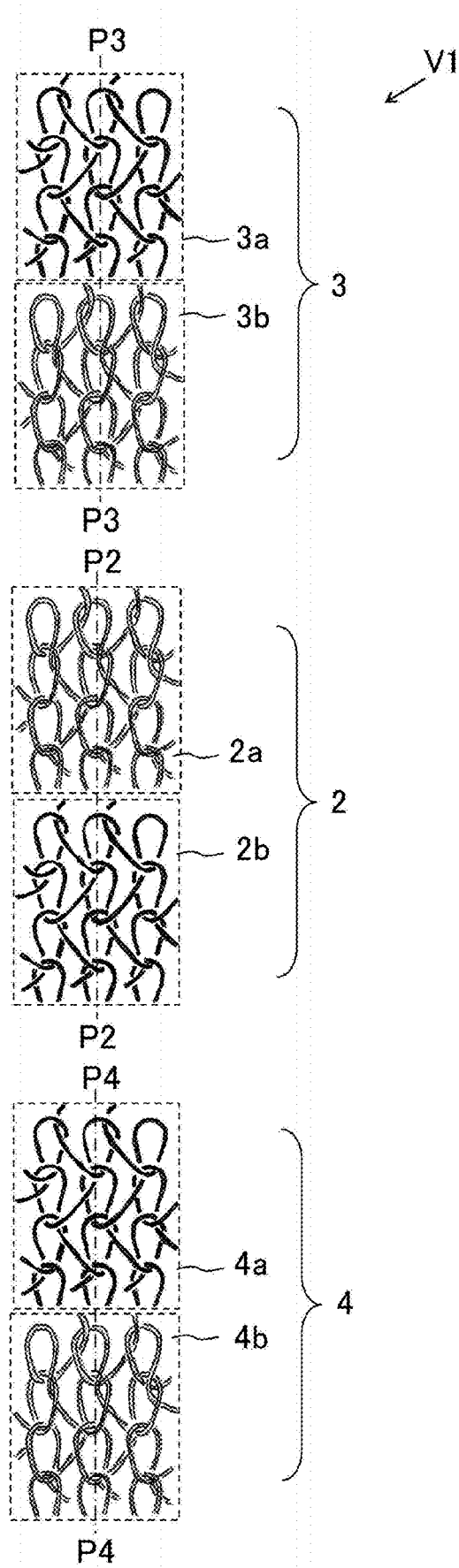
FIG. 3 is a schematic structural development view, which indicates a further example of arranging electrode cloths and a conductive cloth in an area of intersection of a pressure-sensitive sensor of the embodiment.

In the example 3 shown in FIG. 3, the first-surface 3a, the second-surface 2b and the first-surface 4a are face stitch-sides formed by tricot stitch, and the first-surface 2a, the second-surface 3b and the second-surface 4b are back stitch-sides formed by tricot stitch. Further, the wale P3 of the first-electrode 3 is arranged so as to be parallel to the wale P2 of the conductive cloth 2, and the wale P4 of the second-electrode cloth 4 is arranged so as to be parallel to the wale P2 of the conductive cloth 2.

Figure 4:
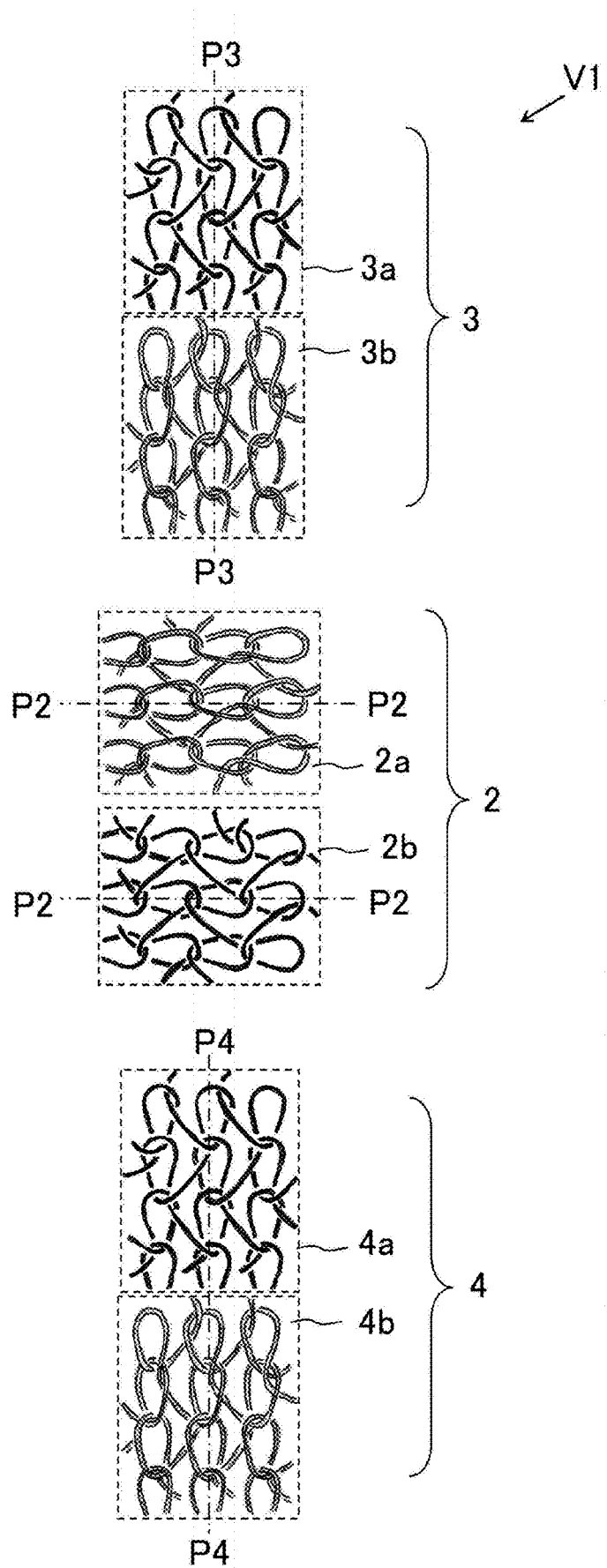
FIG. 4 is a schematic structural development view, which indicates a further example of arranging electrode cloths and a conductive cloth in an area of intersection of a pressure-sensitive sensor of the embodiment.

In the example 4 shown in FIG. 4, the first-surface 3a, the second-surface 2b and the first-surface 4a are face stitch-sides formed by tricot stitch, and the first-surface 2a, the second-surface 3b and the second-surface 4b are back stitch-sides formed by tricot stitch. Further, the wale P3 of the first-electrode 3 is arranged so as to be orthogonal to the wale P2 of the conductive cloth 2, and the wale P4 of the second-electrode cloth 4 is arranged so as to be orthogonal to the wale P2 of the conductive cloth 2.

It is not limited to the above-described examples, so there is a case that, for example, the first-electrode cloth 3 and the second-electrode cloth 4 are formed by weft stitch, and the conductive cloth 2 is formed by warp stitch. Further, there is a case that the first-electrode cloth 3 and the second-electrode cloth 4 are formed by warp stitch, and the conductive cloth 2 is formed by weft stitch. Known knitting patterns may be applied, and a combination of knitting patterns may be optionally set. The face stitch-side of the knit and the back stitch-side of the knit are the surfaces disposed apart 180 [degrees] from each other and directed in the opposite directions, and the both are in a relative relation. Note that, the first-electrode cloth 3 and the second-electrode cloth 4 will be sometimes written as "electrode cloth 3" and "electrode cloth 4".

Figure 5:
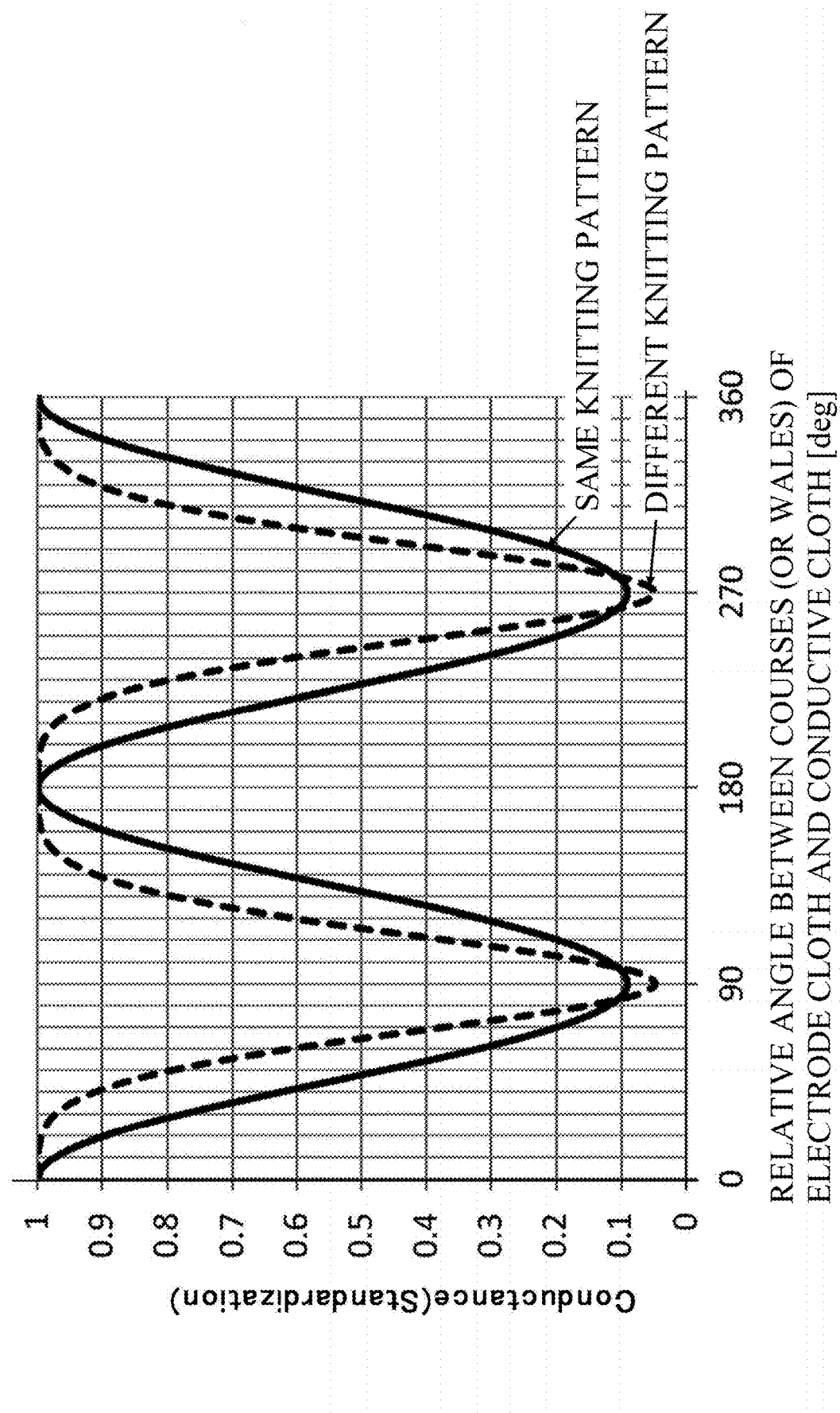
FIG. 5 is a graph showing relationships between relative angles between the electrode cloth and the conductive cloth of the pressure-sensitive sensor of the embodiment and conductance while pressurizing.

FIG. 5 is a graph showing relationships between relative angles between the courses (or the wales) of the electrode cloths 3 and 4 and those of the conductive cloth 2 of the pressure-sensitive sensor 1 of the embodiment and conductance while pressurizing. The vertical axis of the graph indicates conductance while pressurizing wherein conductance, which is an inverse number of an average resistance value of the area V1 of intersection in a thickness direction and which is measured in a state where an external force of 50 [mmHg] is applied in a compaction direction to move the electrode cloths 3 and 4 close to each other, is standardized. The horizontal axis of the graph indicates the relative angles between the courses (or the wales) of the electrode cloths 3 and 4 and those of the conductive cloth 2, and the relative angle is 180 [degrees] or 360 [degrees] when the courses (or the wales) are arranged in parallel. Further, the relative angle is 90 [degrees] or 270 [degrees] when the courses (or the wales) are arranged orthogonally.

In case that knitting patterns are the same in FIG. 1 and FIG. 2 (or FIG. 3 and FIG. 4), a waveform of conductance becomes a nearly sinewave shown by a solid-line waveform in FIG. 5, conductance while pressurizing is increased and dispersion of contact resistances with respect to variation of the relative angle becomes small when the courses (or the wales) are arrange in parallel. Further, conductance while pressurizing is reduced and dispersion of contact resistances with respect to variation of the relative angle becomes small when the courses (or the wales) are arranged orthogonally. Namely, the structure, in which the courses (or the wales) of the electrode cloths 3 and 4 are arranged in parallel to those of the conductive cloth 2, and another structure, in which the courses (or the wales) of the electrode cloths 3 and 4 are arranged orthogonal to those of the conductive cloth 2, are preferable structures because dispersion of contact resistances can be small and reproducibility of pressure-sensitive resistance can be made high.

In a case that the conductive cloth 2 shown in FIG. 3 or FIG. 4 is applied to the structure shown in FIG. 1 or FIG. 2 (or in a case that the conductive cloth 2 shown in FIG. 1 or FIG. 2 is applied to the structure shown in FIG. 3 or FIG. 4) and that the knitting patterns are different, a peak on a high conductance-side of the near sine-waveform shown in FIG. 5 collapses or forms like a trapezoid as shown by a dotted-line waveform, conductance while pressurizing is increased when the courses (or the wales) are arranged in parallel, and dispersion of contact resistances with respect to variation of the relative angle becomes small. Further, conductance while pressurizing is reduced when the courses (or the wales) are arranged orthogonally, and dispersion of contact resistances with respect to variation of the relative angle becomes small.

As shown in FIG. 5, in a case that the courses (or the wales) of the electrode cloths 3 and 4 are arranged to be parallel to those of the conductive cloth 2 or that the courses (or the wales) of the electrode cloths 3 and 4 are arranged to be orthogonal to those of the conductive cloth 2, dispersion of contact resistances becomes small and reproducibility of pressure-sensitive resistances becomes high, so that these structures are suitable. From a viewpoint of reducing dispersion of contact resistances (equivalent to dispersion of pressure-sensitive resistances) according to assembling accuracy of the electrode cloths 3 and 4 and the conductive cloth 2, the structure that the courses (or the wales) are arranged orthogonally on a high resistance-side (a low conductance-side) makes dispersion of contact resistances small, and reproducibility of pressure-sensitive resistances becomes high, so that these structures are suitable.

Resistance values of electrode stripes of the electrode cloths 3 and 4 in longitudinal directions are two digits or more smaller than a minimum value of pressure-sensitive resistance (a pressure-sensitive resistance value when applying maximum pressure) of the conductive cloth 2 constituting a pressure-sensitive part in a thickness direction, so that position dependency of pressure-sensitive resistances of the pressure-sensitive cells (the areas V1 of intersection) matrically arranged can be suppressed. From a viewpoint of suppressing position dependency of pressure-sensitive resistances, the structure that the courses (or the wales) are arranged orthogonally on a low resistance-side (a high conductance-side) makes dispersion of contact resistances small, reproducibility of pressure-sensitive resistances becomes high, and pressure-sensitive resistance values can be made small, so that this structure is suitable.

Figure 6:
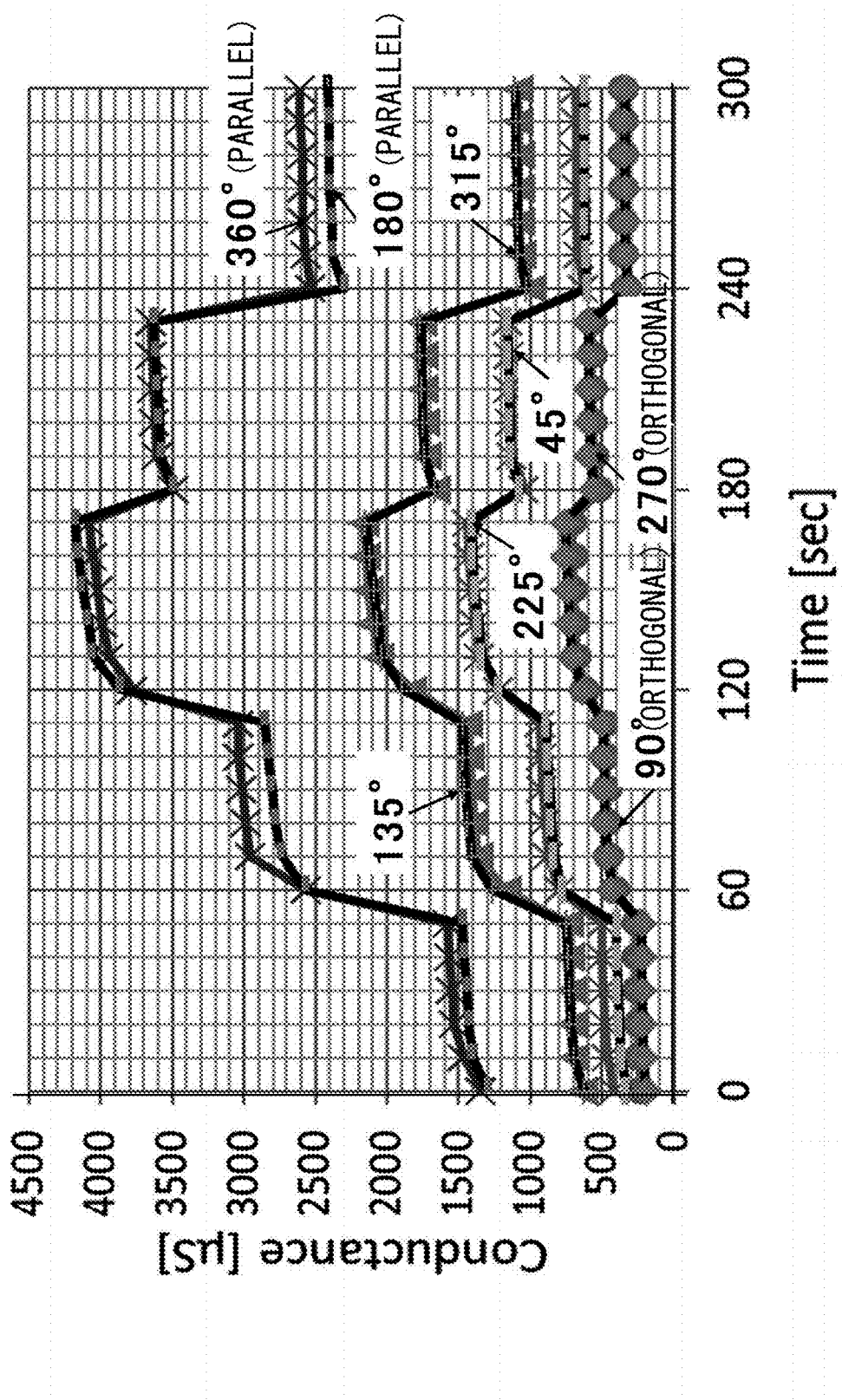
FIG. 6 is a graph showing relationships between relative angles between the electrode cloth and the conductive cloth of the pressure-sensitive sensor of the embodiment and conductance while pressurizing.

FIG. 6 is a graph showing relationships between relative angles between the courses (or the wales) of the electrode cloths 3 and 4 and those of the conductive cloth 2 of the pressure-sensitive sensor 1 of the embodiment and conductance while pressurizing. The vertical axis of the graph indicates conductance per square inch. The horizontal axis of the graph indicates elapsed time of applying pressure stepwise, in a compaction direction to move the electrode cloths 3 and 4 close to each other, from an initial state.

In a state where the knitting patterns are the same in FIG. 1 and FIG. 2 (or FIG. 3 and FIG. 4) and positions of the electrode cloths 3 and 4 are fixed, an external force of 50 [mmHg] is applied for 60 [sec.], an external force of 100 [mmHg] is applied for 60 [sec.], an external force of 150 [mmHg] is applied for 60 [sec.], an external force of 100 [mmHg] is applied for 60 [sec.], and an external force of 50 [mmHg] is applied for 60 [sec.], in this order, to positions in the conductive cloth 2 which are arranged in a counterclockwise direction and located at angular positions of 45 [degrees], 90 [degrees], 135 [degrees], 180 [degrees], 225 [degrees], 270 [degrees], 315 [degrees] and 360 [degrees] in planar view, and conductance per square inch is measured every time ten [sec.] elapses. As shown in FIG. 6, the structure in which the courses (or the wales) are arranged in parallel makes reproducibility of pressure-sensitive resistance high and is capable of making pressure-sensitive resistance values small.

According to the results of FIG. 5 and FIG. 6, the structure in which the courses of the electrode cloths 3 and 4 are arranged in parallel to those of the conductive cloth 2 makes dispersion of contact resistances small, makes reproducibility of pressure-sensitive resistances high and makes pressure-sensitive resistance values small. Further, a quantity of conductive carbon black to be added to the conductive cloth 2 can be reduced, so that a production cost of the conductive cloth 2 can be reduced and the pressure-sensitive sensor 1, in which both of flexibility and abrasion-resistance are enhanced, can be produced.

First-Example

Figure 8:
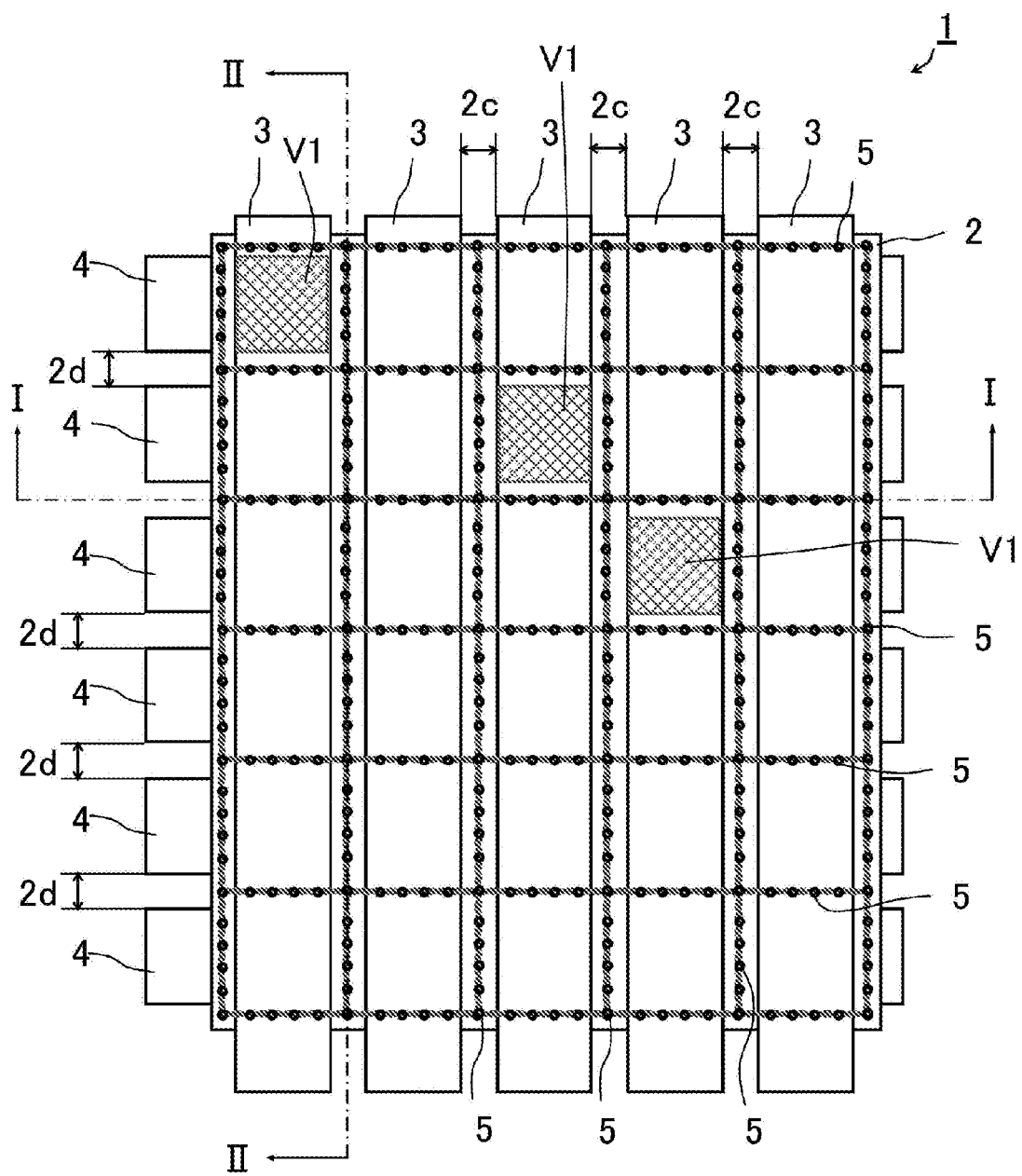
FIG. 8 is a schematic plan view of the pressure-sensitive sensor of the first-example.
Figure 9A:
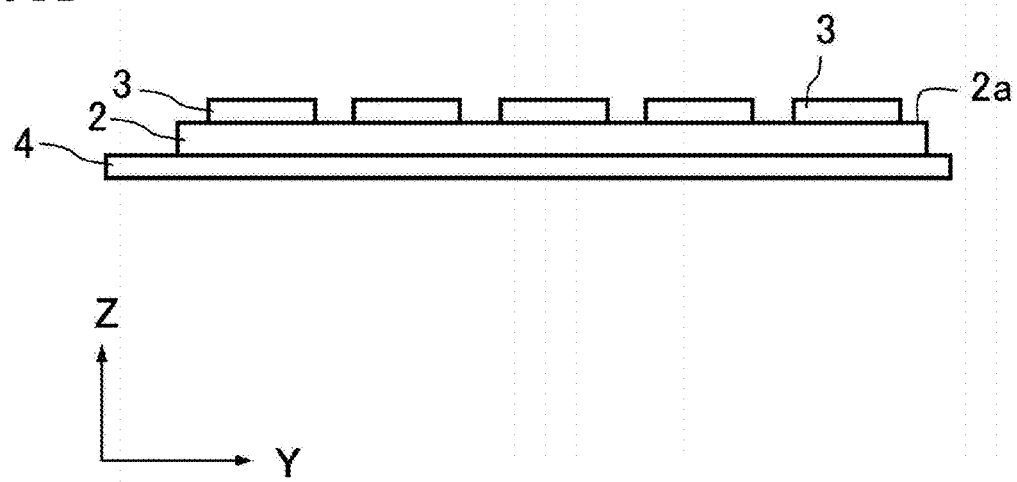
FIG. 9A is a schematic front view of the pressure-sensitive sensor of the first-example.
Figure 9B:
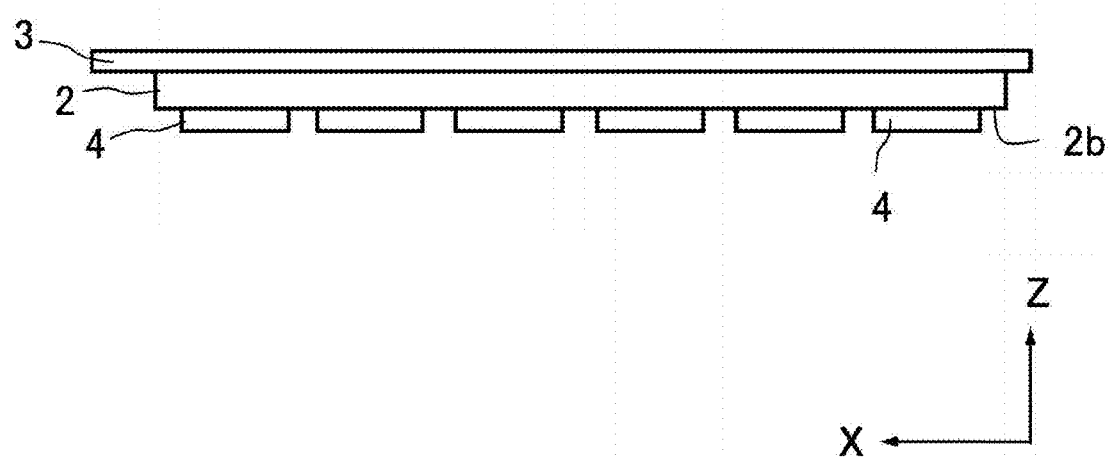
FIG. 9B is a schematic side view of the pressure-sensitive sensor of the first-example.

Successively, a first-example of the present embodiment will be explained in detail. FIG. 7 is a schematic perspective view of the pressure-sensitive sensor 1 of the first-example. FIG. 8 is a schematic plan view of the pressure-sensitive sensor 1 of the first-example. FIG. 9A is a schematic front view of the pressure-sensitive sensor 1 of the first-example, and FIG. 9B is a schematic side view of the pressure-sensitive sensor 1 of the first-example. Here, to easily explain positional relationships between the structural members of the pressure-sensitive sensor 1, directions are indicated by arrows in the drawings. In case of actually using the pressure-sensitive sensor 1, directions are not limited to the shown directions, and the sensor may be directed in any directions.

The pressure-sensitive sensor 1 of the first-example comprises: a square-shaped conductive cloth 2; a plurality of the belt-shaped first-electrode cloths 3 being provided on the first-surface 2a of the conductive cloth 2 and arranged at first-intervals 2c; a plurality of the belt-shaped second-electrode cloths 4 being provided on the second-surface 2b of the conductive cloth 2 and arranged, in a direction intersecting with the first-electrode cloths 3, at second-intervals 2d; and non-conducting sewing threads 5. In this example, the first-electrode cloths 3 are provided on the first-surface 2a of the conductive cloth 2 and arranged to be nearly parallel, the second-electrode cloths 4 are provided on the first-surface 2b of the conductive cloth 2 and arranged to be nearly parallel, and the second-electrode cloths 4 are arranged to be nearly orthogonal to the first-electrode cloths 3. Note that, the shapes of the conductive cloth 2, the first-electrode cloths 3 and the second-electrode cloths 4 are not limited to the square shapes, so each of the cloths is sometimes formed into a square shape with rounded corners or an elliptical shape.

As shown in FIG. 10A, in the pressure-sensitive sensor 1, the second-electrode cloth 4 is sewn to the conductive cloth 2, with the sewing threads 5, in first-gaps between the first-electrode cloth 3 and the first-electrode cloth 3. And, as shown in FIG. 10B, the first-electrode cloth 3 is sewn to the conductive cloth 2, with the sewing threads 5, in second-gaps between the second-electrode cloth 4 and the second-electrode cloth 4. Further, the areas V1 of intersection between the first-electrode cloths 3 and the second-electrode cloths 4 are formed so as to have a matrix structure in planar view. In FIG. 7 and FIG. 8, the areas V1 of intersection are indicated as hatched square areas.

In the example shown in FIG. 8, the sewing threads 5 are sewn to enclose the areas V1 of intersection. Further, the sewing threads 5 are sewn at outside positions of four corners of each area V1 of intersection. With this structure, leak current from the area V1 of intersection to other areas V1 of intersection can be reduced by the sewing threads 5, so that S/N ratio of detection signals corresponding to pressure can be improved.

As shown in FIG. 10A, parts of the first-electrode cloths 3 to which the sewing threads 5 are sewn are recessed by tension of the sewing threads 5. Further, as shown in FIG. 10B, parts of the second-electrode cloths 4 to which the sewing threads 5 are sewn are recessed by tension of the sewing threads 5. With this structure, detection dead areas are formed, in the sewn parts, by tightening the sewing threads 5 in the vertical direction, so that variation of resistance values in parts other than the areas V1 of intersection can be suppressed, and S/N ratio of detection signals corresponding to pressure can be improved. In some cases, the sewing threads 5 are sewn to positions corresponding to the four corners of each area V1 of intersection, and also the above-described effects can be obtained in this case.

Figure 11A:
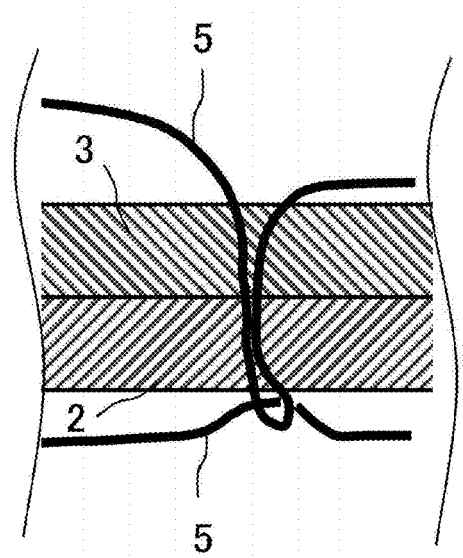
FIG. 11A is a schematic sectional view showing a state where a knot is formed by passing a lower thread through a loop-shaped upper thread penetrating through the electrode cloth and the conductive cloth by a sewing machine.
Figure 11B:
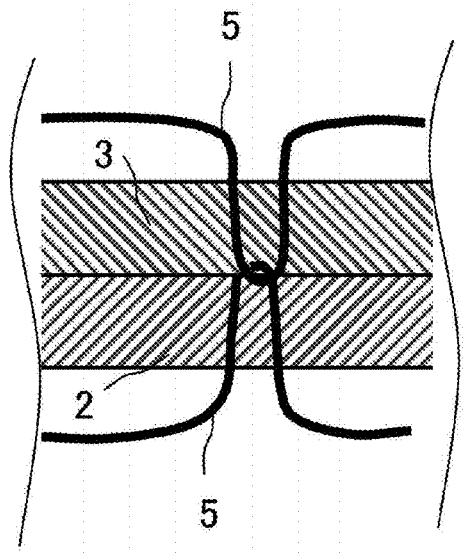
FIG. 11B is a schematic sectional view showing a state where the knot is disposed between the electrode cloth and the conductive cloth by pulling the knot upward.
Figure 11C:
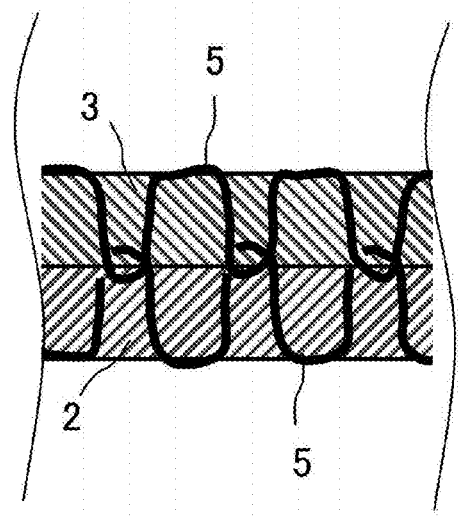

FIG. 11A, FIG. 11B and FIG. 11C are schematic sectional views showing steps of sewing the first-electrode cloth 3 and the conductive cloth 2 by using a sewing machine. As an example, in case of lock stitch sewing, a knot is formed by passing a lower thread through a loop-shaped upper thread penetrating through the first-electrode cloth 3 and the conductive cloth 2 by the sewing machine (FIG. 11A), the knot is disposed between the first-electrode cloth 3 and the conductive cloth 2 by pulling the knot upward (FIG. 11B), and the first-electrode cloth 3 and the conductive cloth 2 are sewn by repeatedly moving the cloths in a prescribed direction with forming knots (FIG. 11C). In case of sewing the second-electrode cloth 4 and the conductive cloth 2, the same sewing steps shown in FIG. 11A, FIG. 11B and FIG. 11C are performed by the sewing machine as well.

In the present embodiment, a width of the first-electrode cloth 3 in a transverse direction is wider than that of the first-interval 2c, and a width of the second-electrode cloth 4 in a transverse direction is wider than that of the second-interval 2d. With this structure, leak current from an adjacent measurement position can be reduced, so that S/N ratio of detection signals corresponding to pressure can be improved. As an example, the widths of the first-electrode cloths 3 and the second-electrode cloths 4 in the transverse directions are 10-100 [mm]. Further, as an example, the widths of the first-intervals 2c and the second-intervals 2d in the transverse direction are 1-10 [mm].

In the present embodiment, a thickness of the conductive cloth 2 is smaller than the width of the first-interval 2c in the transverse direction, and the thickness of the conductive cloth 2 is smaller than the width of the second-interval 2d in the transverse direction. With this structure, leak current from an adjacent measurement position can be reduced, so that S/N ratio of detection signals corresponding to pressure can be improved. As an example, the thickness of the conductive cloth 2 is 0.3-0.6 [mm]. Further, as an example, the thicknesses of the first-electrode cloths 3 and the second-electrode cloths 4 are 0.2-0.6 [mm].

In the present embodiment, by the structure of conductive carbon black, the conductive cloth 2 is electrically conductive in a thickness direction, a longitudinal direction and a transverse direction (not shown). By the structure of yarns coated with silver (conducting fiber yarns), the first-electrode cloths 3 are electrically conductive in a thickness direction, a longitudinal direction and a transverse direction (not shown). The second-electrode cloths 4 are equivalent to the first-electrode cloths 3.

In the present embodiment, the conductive carbon black is at least any one selected from KETJENBLACK™, acetylene black, channel black and furnace black each of which has an average primary particle diameter of 100 nm or less. With this structure, a required resistance value can be obtained by adding a small quantity of the conductive carbon black, so that the conductive cloth 2 having superior abrasion-resistance and flexibility can be produced.

Furnace black is produced by a furnace method, in which conductive carbon black is obtained by performing incomplete combustion of oil or gas. Furnace black can be easily mass-produced, and its particle diameter and structure can be easily controlled.

Channel black is produced by a channel method, in which a natural gas is combusted, and matters separated on channel steel are collected. Channel black has many surface functional groups, so it is suitable for coating.

Acetylene black is produced by an acetylene method, in which an acetylene gas is thermally decomposed. Acetylene black has high electrical conductivity and includes a small quantity of impure substances.

KETJENBLACK™ is produced by an oil furnace method, in which conductive carbon black is produced by, roughly, performing incomplete combustion of oil including a small quantity of impure substances, separating a by-product gas, and granulating and drying a precursor. Unlike other conductive carbon blacks, KETJENBLACK™ has a hollow shell-like structure, so its electrical conductivity is higher than that of acetylene black.

As an example, a catalogue value of a BET-specific surface area of KETJENBLACK™ EC300J, which is produced by Lion Specialty Chemicals Co., Ltd., is 800 [m$^2$/g], and a catalogue value of a BET-specific surface area of KETJENBLACK™ EC600JD is 1270 [m$^2$/g] or more, so they are 10 times or more greater than a BET-specific surface area of standard acetylene black. Therefore, high electrical conductivity can be obtained by adding a small quantity thereof, so that the conductive cloth 2 having superior abrasion-resistance and superior flexibility can be produced.

In the present embodiment, all of the conductive cloth 2, the first-electrode cloths 3 and the second-electrode cloths 4 are composed of knitted fabrics. With this structure, the pressure-sensitive sensor 1 has superior stretchability and flexibility with less uncomfortable feeling, and the large pressure-sensitive sensor 1 capable of measuring pressure distribution in a wide range corresponding to human bodies can be produced.

In the present embodiment, a mixture of the conductive carbon black and a binder resin whose rupture elongation is 100% or more is applied to coat the conductive cloth 2. With this structure, pressure can be stably measured with taking advantage of flexibility of the conductive cloth 2. As an example, the conductive carbon black is adhered to a surface of a base cloth of the conductive cloth 2 and inside of fibers thereof. As an example, the first-electrode cloths 3 and the second-electrode cloths 4 are composed of same material.

With the above-described structure, in the present embodiment, surface resistivities of both of the first-electrode cloths 3 and the second-electrode cloths 4 are two digits or more smaller than that of the conductive cloth 2. Therefore, influences of the resistances of the first-electrode cloths 3 and the second-electrode cloths 4 in the longitudinal direction are reduced, so that S/N ratio of detection signals, which are outputted in response to pressure, can be improved. Namely, influences of measured resistances in the areas V1 of intersection, which act as pressure-sensitive parts, can be almost ignored. And, the conductive cloth 2 having superior dispersion stability can be produced with the conductive carbon black, which is more inexpensive than conductive metal particles; and a required resistance value can be obtained by adding a small quantity of the conductive carbon black, so that the conductive cloth 2 having superior abrasion-resistance and flexibility can be produced. Further, dispersion of resistance values according to measurement positions can be suppressed, and cross talk between the areas V1 and V1 of intersection can be suppressed.

As an example, the base cloths may be composed of synthetic fibers, e.g., nylon, polyester, rayon, acrylic, polyamide. In a medical field, performing autoclave sterilization is assumed, so said fibers having high resistance to the autoclave sterilization are preferable. As an example, the base cloths are knitted fabrics. A thickness of threads or fibers constituting the base cloths is, as an example, 20-200 denier. The base cloths are knitted fabrics, so that their stretchability is greater than that of woven fabrics and nonwoven fabrics, and the pressure-sensitive sensor 1 having superior pressure-sensitive characteristic can be produced.

The conductive carbon black has a branch structure, can reduce a resistance value thereof by tunnel effect and can be obtained with at a lower price than noble metals and conductive high polymers. Especially, in case of using KETJENBLACK™, the required resistance value can be obtained by adding a small quantity thereof, so that the conductive cloth 2 having superior abrasion-resistance and superior flexibility can be produced.

For example, the binder resin is thermoplastic resin, thermosetting resin or photosetting resin. For example, the binder resin may be polyamide (PA), polycarbonate (PC), polyethylene terephthalate (PET), polyurethane (PU), polyester (PEs) or other known synthetic resins.

Coating may be performed by an immersion coating method, a spray coating method, a roll coating method, a bar coating method, an electrocoating method, other known coating methods or combinations thereof.

The sewing threads 5 are composed of synthetic fibers, e.g., nylon, polyester, rayon, acrylic, polyamide, or natural fibers, e.g., cotton, linen. A thickness of the sewing threads 5 is, as an example, 20-200 denier.

For example, the sewing operation is manually performed or performed by a sewing machine. Lock stitching, chain stitching, whip stitching, flat stitching or other known stitching manners may be employed for the sewing operation. In case of the lock stitching, the parts to which the sewing threads 5 are sewn become non-stretchable seams in the first-surface 2a (the front surface) and the second-surface 2b (the back surface), non-sensitive parts are formed, and fluctuations of resistance values at positions, at which no areas V1 of intersection are formed, can be suppressed, so that the areas V1 of intersection, which are formed so as to have the matrix structure, can easily act as independent pressure cells capable of respectively outputting electric signals.

Figure 12:
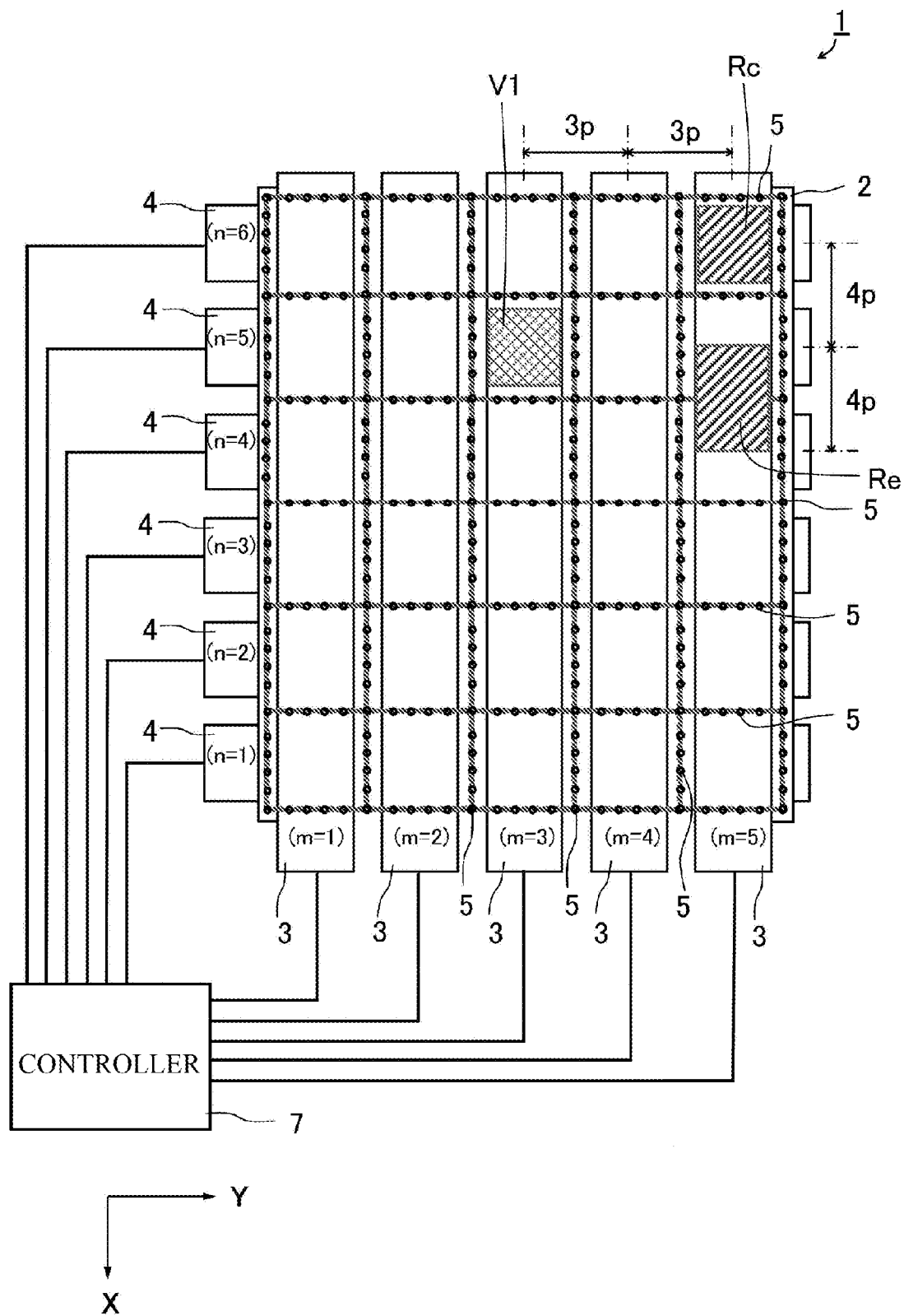
FIG. 12 is a schematic plan view of the pressure-sensitive sensor of the first-example, in which a controller is connected.
Figure 13:
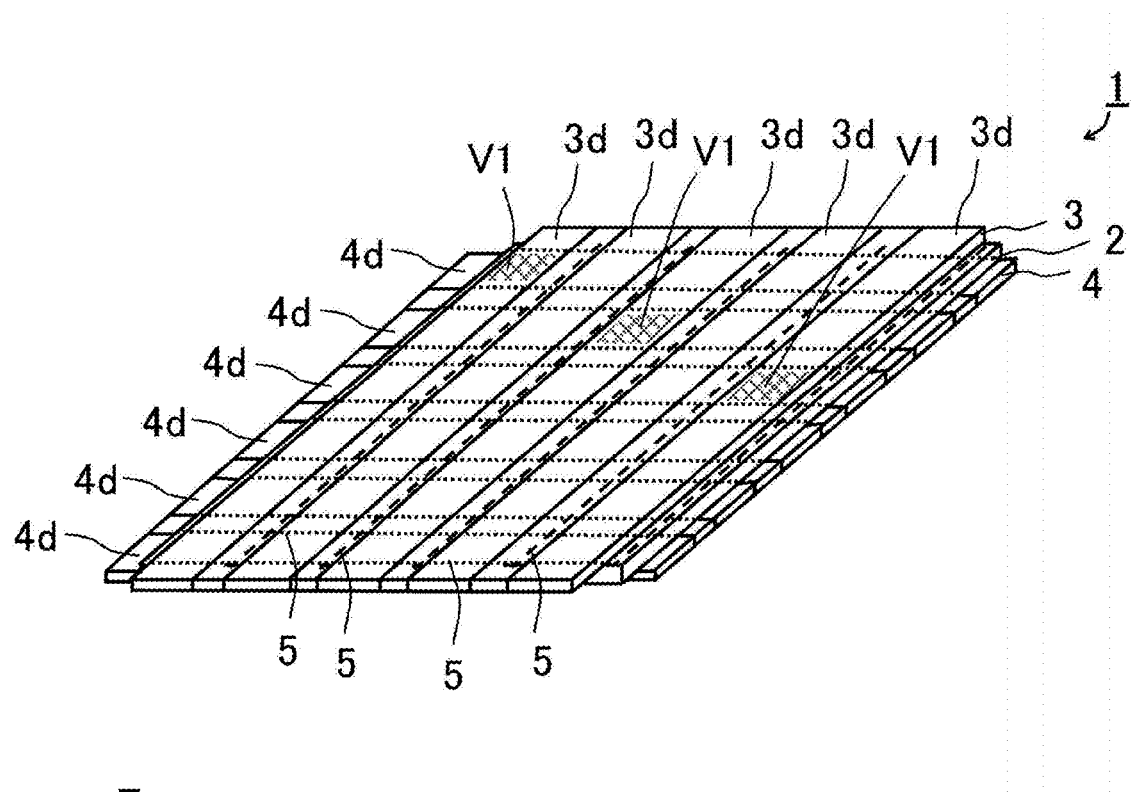
FIG. 13 is a schematic perspective view of a pressure-sensitive sensor of a second-example.

FIG. 12 is a schematic plan view of the pressure-sensitive sensor 1 relating to the first-example, in which a controller 7 is connected. The controller 7 has a CPU for controlling a signal wire switching circuit, a signal detector, an A/D converter, semiconductor memories and an arithmetic circuit. In the pressure-sensitive sensor 1, signal wires are connected to longitudinal end parts of the first-electrode cloths 3 and the second-electrode cloths 4 arranged at prescribed intervals, scan is performed at a frequency of, as an example, 10-100 [Hz] by the switching circuit included in the controller 7, resistance values of the areas V1 of intersection, which are formed so as to have the matrix structure, are respectively detected, with millisecond order, by the signal detector, the detected signals are A/D-converted by the A/D converter, data are stored in the semiconductor memories and calculated by the arithmetic circuit, and results of calculation are finally displayed on an external display unit as pressure values, pressure distribution or pressure values plus pressure distribution. As an example, a personal computer including an interface substrate for signal-connecting to the pressure-sensitive sensor 1 may be used as the controller 7 and the external display unit.

In the present embodiment, the [m] number of first-electrode cloths 3 are arranged at the first-intervals 2c on the first-surface 2a of the conductive cloth 2, the [n] number of second-electrode cloths 4 are arranged at the second-intervals 2d on the second-surface 2b of the conductive cloth 2, in the direction intersecting the first-electrode cloths 3, and the areas V1 of intersection, which are the areas between the first-electrode cloths 3 and the second-electrode cloths 4, are formed so as to have the matrix structure. Here, the numbers [m] and [n] are natural numbers of 2 or more, and the numbers are, for example, m=5 and n=6 in the example shown in FIG. 12.

In the present embodiment, a resistance value Re [Ω], which is an average resistance value of the two areas V1 and V1 of intersection longitudinally adjacent to each other in the longitudinal direction, with respect to a resistance value Rc [Ω], which is an average resistance value of the areas V1 of intersection, in the thickness direction, in a state where an external force of 50 [mmHg] is applied, in the compaction direction, to move the first-electrode cloths 3 and the second-electrode cloths 4 close to each other, satisfies the following Formula (1).

Formula (1):

$$1 < Re < (Rc/(m+n)) \qquad (1)$$

With the above-described structure, pressure can be stably measured with taking advantage of flexibility of the cloths, the size capable of performing wide-range pressure distribution measurement can be enabled, the material cost can be reduced, and productivity can be improved. Further, surface resistances of the belt-like electrodes, which are provided on the upper side and the lower side of the conductive cloth 2, are two digits or more smaller than the surface resistance of the conductive cloth 2, so that pressure measurement accuracy in each of the areas V1 of intersection can be improved.

As shown in FIG. 12, in case that an electrode pitch 3p of the first-electrode cloths 3 in the row direction is equal to an electrode pitch 4p of the second-electrode cloths 4 in the column direction, the above-described Formula (1) is satisfied.

In case that the electrode pitch 3p of the first-electrode cloths 3 and the electrode pitch 4p of the second-electrode cloths 4 are different from each other, the resistance value Re [Ω] is obtained from a weighted average value of an electrode resistance value R1 [Ω] of the first-electrode cloths 3 arranged in the row direction with the electrode pitch 3p and an electrode resistance value R2 [Ω] of the second-electrode cloths 4 arranged in the column direction with the electrode pitch 4p, and it is calculated by the following Formula (2).

Formula (2):

$$Re = (m \times R1 + n \times R2)/(m+n) \qquad (2)$$

With the above-described structure, pressure can be stably measured with taking advantage of flexibility of the cloths, the size capable of performing wide-range pressure distribution measurement can be enabled, the material cost can be reduced, and productivity can be improved. Further, surface resistances of the belt-like electrodes (the first-electrode cloths 3 and the second-electrode cloths 4), which are provided on the upper side and the lower side of the conductive cloth 2, are two digits or more smaller than the surface resistance of the conductive cloth 2, so that pressure measurement accuracy in each of the areas V1 of intersection can be improved.

Second-Example

Figure 14:
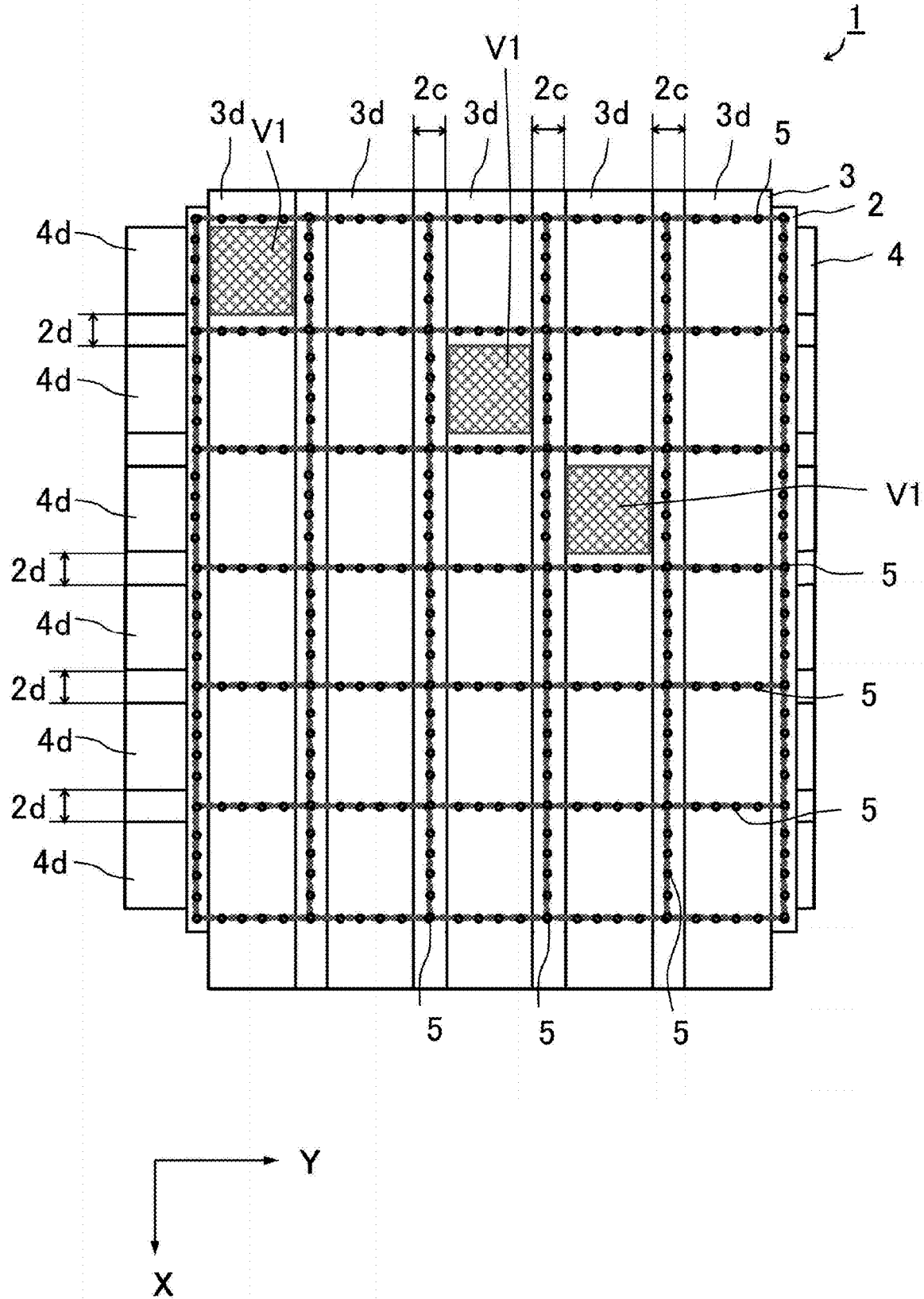
FIG. 14 is a schematic plan view of the pressure-sensitive sensor of the second-example.
Figure 15A:
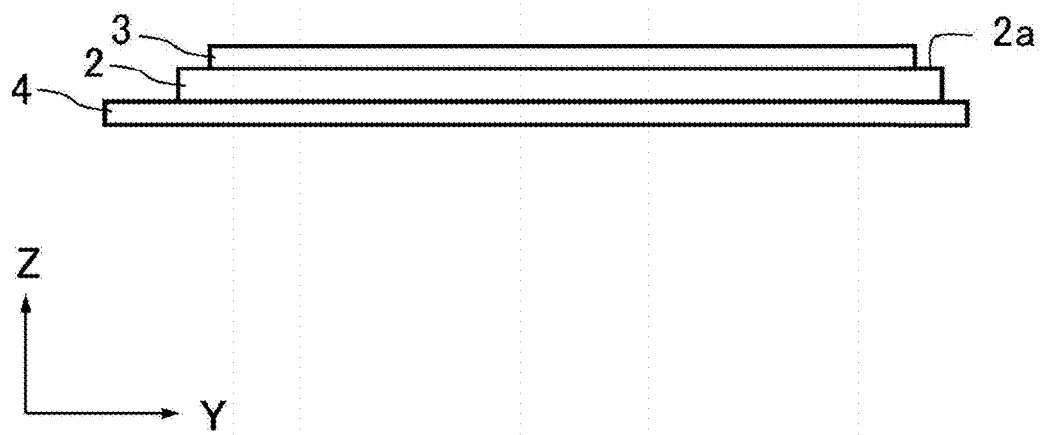
FIG. 15A is a schematic front view of the pressure-sensitive sensor of the second-example.
Figure 15B:
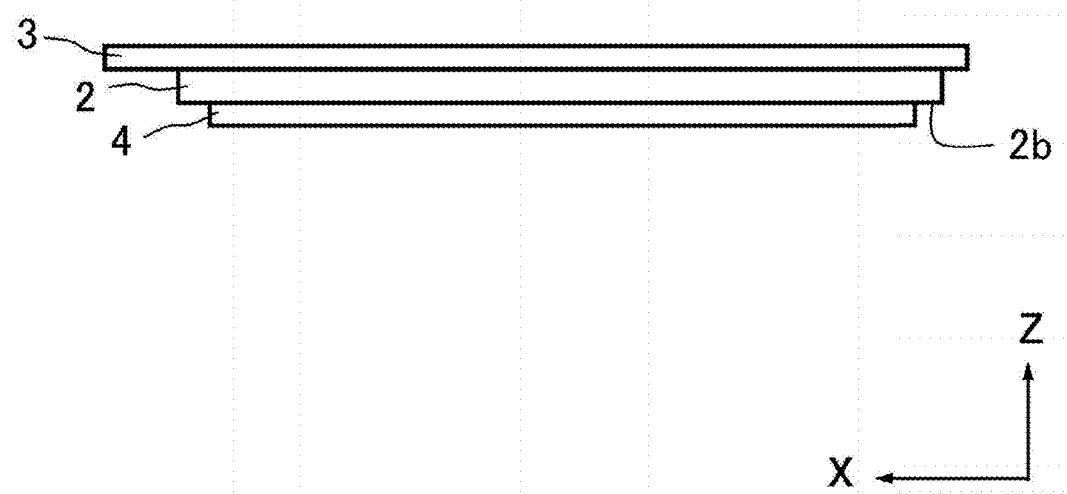
FIG. 15B is a schematic side view of the pressure-sensitive sensor of the second-example.

Successively, a second-example of the present embodiment will be explained in detail. FIG. 13 is a schematic perspective view of the pressure-sensitive sensor 1 of the second-example. FIG. 14 is a schematic plan view of the pressure-sensitive sensor 1 of the second-example. FIG. 15A is a schematic front view of the pressure-sensitive sensor 1 of the second-example, and FIG. 15B is a schematic side view of the pressure-sensitive sensor 1 of the second-example. For convenience of explanation, a cover cloth, signal wires, etc. are omitted in FIG. 13, etc. In the second-example, differences from the first-example will be mainly explained.

In the present embodiment, one first-electrode cloth 3 is provided on the first-surface 2a of the conductive cloth 2, one second-electrode cloth 4 is provided on the second-surface 2b of the conductive cloth 2, a plurality of first-electrodes 3d are formed, at the first-intervals 2c, on the first-electrode cloth 3, a plurality of second-electrodes 4d are formed, at the second-intervals 2d, on the second-electrode cloth 4, the second-electrodes 4d intersect with the first-electrodes 3d, and the areas V1 of intersection between the first-electrodes 3d and the second-electrodes 4d are formed so as to have a matrix structure.

In the present embodiment, a width of the first-electrodes 3d in a transverse direction is wider than that of the first-intervals 2c in a transverse direction, and a width of the second-electrodes 4d in a transverse direction is wider than that of the second-intervals 2d in a transverse direction. With this structure, leak current from an adjacent measurement position can be reduced, so that S/N ratio of detection signals, which are outputted in response to pressure, can be improved. As an example, the width of the first-electrodes 3d in the transverse direction and that of the second-electrodes 4d in the transverse direction are 10-100 [mm]. And, as an example, the width of the first-intervals 2c in the transverse direction and that of the second-interval 2d in the transverse direction are 1-10 [mm].

In the present embodiment, a thickness of the conductive cloth 2 is smaller than the width of the first-intervals 2c in the transverse direction, and the thickness of the conductive cloth 2 is smaller than the width of the second-intervals 2d in the transverse direction. With this structure, leak current from an adjacent measurement position can be reduced, so that S/N ratio of detection signals, which are outputted in response to pressure, can be improved. As an example, the thickness of the conductive cloth 2 is 0.3-0.6 [mm]. And, as an example, the thicknesses of the first-electrode cloth 3 and the second-electrode cloth 4 are 0.2-0.6 [mm].

In the second-example, dimensions and numbers of the first-electrode cloth 3 and the second-electrode cloth 4 are different from those of the first-example. On the other elements, e.g., the sewing manners, sewing positions, the conductive carbon black, the conducting fiber yarns, may be similar to those of the first-example.

Figure 16:
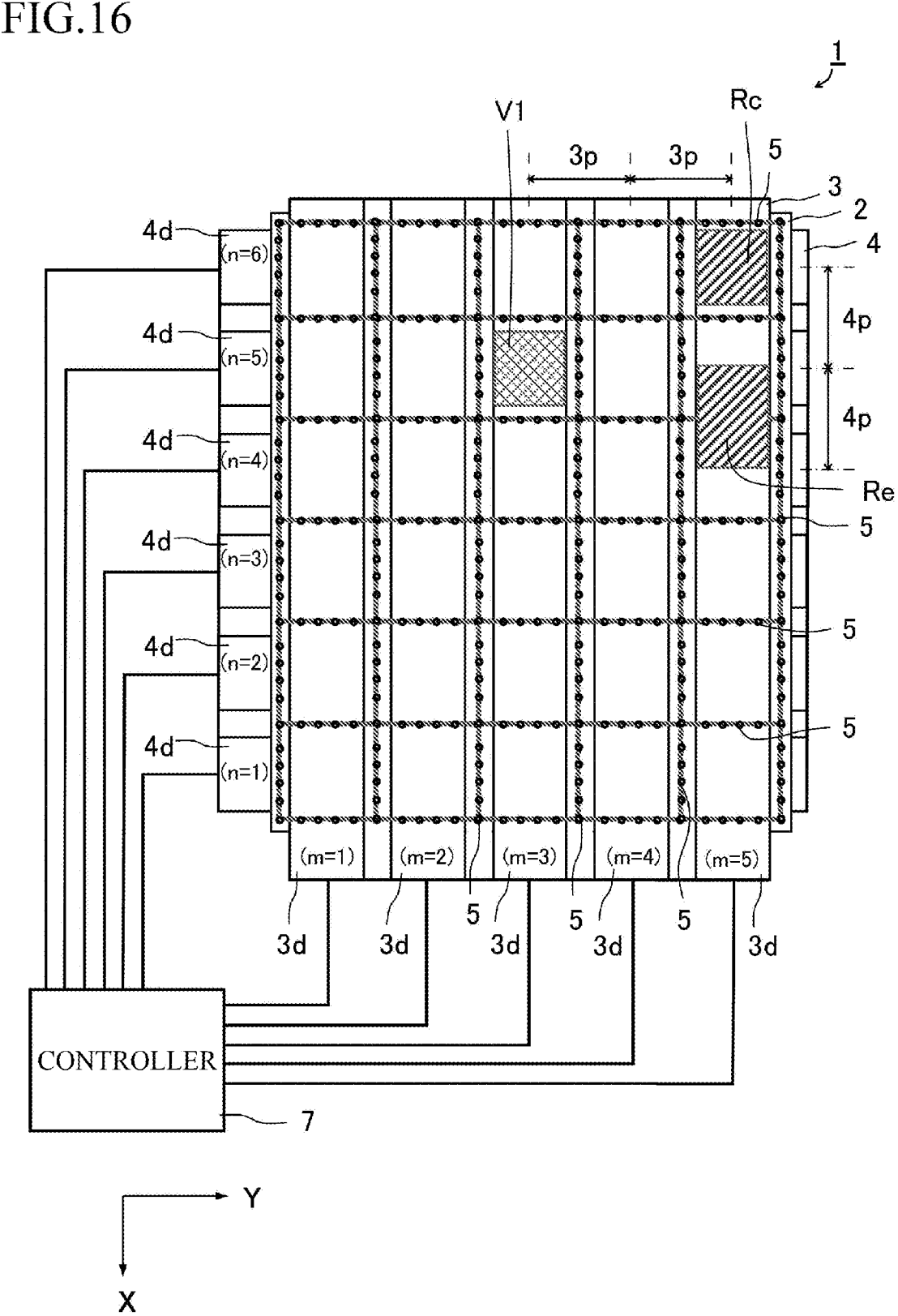
FIG. 16 is a schematic plan view of the pressure-sensitive sensor of the second-example, in which a controller is connected.

FIG. 16 is a schematic plan view of the pressure-sensitive sensor 1 relating to the second-example, in which the controller 7 is connected. The controller 7 has a CPU for controlling a signal wire switching circuit, a signal detector, an A/D converter, semiconductor memories and an arithmetic circuit. In the present embodiment, the one first-electrode cloth 3 is provided on the first-surface 2a of the conductive cloth 2 and the one second-electrode cloth 4 is provided on the second-surface 2b of the conductive cloth 2, the [m] number of first-electrodes 3d are formed, at the first-intervals 2c, on the first-electrode cloth 3, the [n] number of second-electrodes 4d are formed, at the second-intervals 2d, on the second-electrode cloth 4, the second-electrodes 4d intersect with the first-electrodes 3d, and the areas V1 of intersection between the first-electrodes 3d and the second-electrodes 4d are formed so as to have the matrix structure. Here, the numbers [in] and [n] are natural numbers of 2 or more, and the numbers are, for example, m=5 and n=6 in the example shown in FIG. 16.

In the present embodiment, a resistance value Re [Ω], which is an average resistance value of the two areas V1 and V1 of intersection longitudinally adjacent to each other in the longitudinal direction, with respect to a resistance value Rc [Ω], which is an average resistance value of the areas V1 of intersection, in the thickness direction, in a state where an external force of 50 [mmHg] is applied, in the compaction direction, to move the first-electrode cloth 3 and the second-electrode cloth 4 close to each other, satisfies the above-described Formula (1). As shown in FIG. 16, in case that an electrode pitch 3p of the first-electrode cloth 3 in the row direction is equal to an electrode pitch 4p of the second-electrode cloth 4 in the column direction, the above-described Formula (1) is satisfied.

In case that the electrode pitch 3p of the first-electrode cloth 3 and the electrode pitch 4p of the second-electrode cloth 4 are different from each other, the resistance value Re [Ω] is obtained from a weighted average value of an electrode resistance value R1 [Ω] of the first-electrode cloth 3, in which the electrode pitch is 3p in the row direction, and an electrode resistance value R2 [Ω] of the second-electrode cloth 4, in which the electrode pitch is 4p in the column direction, and it is calculated by the above-described Formula (2).

The above-described pressure-sensitive sensor 1 can be applied to, for example, a bed, a mat for bed, a sheet, a cushion, a mat for chair, a health mat, a carpet, etc. For example, by assembling the pressure-sensitive sensor 1 to a bed, a mat for bed or a sheet, forming decubitus ulcer can be prevented by measuring a sleeping posture of a user and inducing roll over with adjusting air pressure of an air mat. Further, by analyzing and calculating pressure waveforms of prescribed parts, the sensor is capable of measuring heartbeat or breath as a heartbeat sensor or a breathing sensor. For example, by assembling the pressure-sensitive sensor 1 to a cushion or a mat for chair, a sitting posture can be measured and leaving seat can be detected, so that human actions can be known, and stiffness in shoulders or lower back pain can be prevented by adjusting pressure of an air cushion and correcting the human posture. For example, by assembling the pressure-sensitive sensor 1 to a health mat or a carpet, a walking posture of the user can be measured, and customizing shoes of the user can be performed by measuring foot pressures in a standing posture. Further, a human weight can be measured from contact resistance, and the sensor can be used for measuring human living habits, e.g., movement in a room.

Usually, in case of measuring pressure distribution in a chair or a bed, the pressure-sensitive sensor 1 is capable of sufficiently measuring pressure within a range from 10 to 200 [mmHg]. Frequency of measurement by the pressure-sensitive sensor 1 is high around 50 [mmHg].

The present invention is not limited to the above-described embodiments, and various modifications may be allowed without deviating the scope of the invention. In some cases, the shape and the size of the above-described pressure-sensitive sensor 1 will be suitably changed according to specifications, etc. of known beds, mats for beds, sheets, cushions, mats for chairs, health mats, carpets.

What is claimed is:

1. A pressure-sensitive sensor comprising: a conductive cloth having a mixture of conductive carbon black and a binder resin applied thereto; a first-electrode cloth disposed on a first-surface of the conductive cloth; and a second-electrode cloth disposed on a second-surface of the conductive cloth,
wherein the conductive cloth is a knitted fabric composed of non-conducting fiber yarns, the first-conductive cloth is a knitted fabric in which a plurality of first-electrodes composed of conducting fiber yarns are formed at first-intervals, the second-conductive cloth is a knitted fabric in which a plurality of second-electrodes composed of conducting fiber yarns are formed at second-intervals, and the first-electrodes and the second-electrodes are arranged in a direction intersecting with each other, or wherein the conductive cloth is a knitted fabric composed of non-conducting fiber yarns, the first-electrode cloths and the second-electrode cloths are knitted fabrics composed of conducting fiber yarns, the first-electrode cloths and the second-electrode cloths are arranged in directions intersecting with each other, and areas of intersection between the first electrode cloths and second electrode cloths are formed so as to have a matrix structure, and
wherein courses or wales of the first-electrode cloth are arranged so as to be parallel or orthogonal to courses or wales of the conductive cloth, and courses or wales of the second-electrode cloth are arranged so as to be parallel or orthogonal to the courses or wales of the conductive cloth.

2. The pressure-sensitive sensor according to claim 1, wherein the first-electrode cloth and the second-electrode cloth are the same knitted fabrics.

3. The pressure-sensitive sensor according to claim 1, wherein a contact surface of the first-electrode cloth which contacts the conductive cloth and a contact surface of the second-electrode cloth which contacts the conductive cloth have the same knitting patterns.

4. The pressure-sensitive sensor according to claim 1, wherein a contact surface of the conductive cloth which contacts the first-electrode cloth and a contact surface of the first-electrode cloth which contacts the conductive cloth have the same knitting patterns, and a contact surface of the conductive cloth which contacts the second-electrode cloth and a contact surface of the second-electrode cloth which contacts the conductive cloth have the same knitting patterns.

5. The pressure-sensitive sensor according to claim 1, wherein a contact surface of the first-electrode cloth which contacts the conductive cloth and the opposite surface thereof have different knitting patterns, a contact surface of the second-electrode cloth which contacts the conductive cloth and the opposite surface thereof have different knitting patterns, and the contact surface of the first-electrode cloth which contacts the conductive cloth and the contact surface of the second-electrode cloth which contacts the conductive cloth have the same knitting patterns.

6. The pressure-sensitive sensor according to claim 1, wherein a pitch of loops in the courses or wales of the first-electrode cloth is set to twice the size of a loop diameter or less, a pitch of loops in the courses or wales of the second-electrode cloth is set to twice the size of a loop diameter or less, and a pitch of loops in the courses or wales of the conductive cloth is set to twice the size of a loop diameter or less.

7. The pressure-sensitive sensor according to claim 1, wherein the non-conducting fiber yarns is a synthetic yarn including at least any one of polyester, polyamide, nylon, rayon, acrylic and polyurethane, and the conducting fiber yarns is a covered yarn in which a synthetic core yarn including at least any one of polyamide, nylon, rayon, acrylic and polyurethan is covered with a yarn, which is formed by coating a polyester yarn, polyamide yarn or nylon yarn with silver, or a wooly-processed yarn, which is formed by coating a polyester yarn, polyamide yarn or nylon yarn with silver and being wooly-processed.

8. The pressure-sensitive sensor according to claim 1, wherein the conductive carbon black has an average particle diameter of the primary particles being 100 nm or less.

9. The pressure-sensitive sensor according to claim 1, wherein a weight of the conductive carbon black with respect to that of the conductive cloth is 1% to 5%.

10. The pressure-sensitive sensor according to claim 1, further comprising sewing threads, wherein the first-electrode cloth is sewn to the conductive cloth with the sewing threads, and the second-electrode cloth is sewn to the conductive cloth with the sewing threads.

\* \* \* \* \*